(12) United States Patent
Nadendla et al.

(10) Patent No.: US 12,514,399 B2
(45) Date of Patent: Jan. 6, 2026

(54) ARTIFICIAL INTELLIGENCE DRIVEN COOKING SYSTEM AND METHODS EMPLOYED THEREOF

(71) Applicant: Futuristic Labs Private Limited, Telangana (IN)

(72) Inventors: GouthamGandhi Nadendla, Visakhapatnam (IN); Veerababu Vattikuti, Hyderabad (IN); Abel Roy, Hyderabad (IN); Surendra Bharath Palle, Kurnool (IN); Mohammad Javeed, Hyderabad (IN); Zeeshan Vervatwala, Hyderabad (IN)

(73) Assignee: Futuristic Labs Private Limited, Hyderabad (IN)

( * ) Notice: Subject to any disclaimer, the term of this patent is extended or adjusted under 35 U.S.C. 154(b) by 1097 days.

(21) Appl. No.: 17/396,720

(22) Filed: Aug. 8, 2021

(65) Prior Publication Data

US 2024/0041251 A1 Feb. 8, 2024

Related U.S. Application Data

(63) Continuation-in-part of application No. 16/382,350, filed on Apr. 12, 2019, now abandoned.

(30) Foreign Application Priority Data

Apr. 13, 2018 (IN) .............................. 201841014237
Apr. 12, 2019 (IN) .............................. 201841014237

(51) Int. Cl.
*A47J 36/16* (2006.01)
*A47J 27/04* (2006.01)
(Continued)

(52) U.S. Cl.
CPC ............. *A47J 36/321* (2018.08); *A47J 27/04* (2013.01); *A47J 36/165* (2013.01); *A47J 44/00* (2013.01);
(Continued)

(58) Field of Classification Search
CPC ........ A47J 36/321; A47J 27/04; A47J 36/165; A47J 44/00; A47J 47/01; A47J 2027/043; G06N 20/00; A61B 5/4866; H05B 6/062
(Continued)

(56) References Cited

U.S. PATENT DOCUMENTS 8,145,854 B1 * 3/2012 Lee .................. G06Q 10/06316
99/325
8,688,277 B2 * 4/2014 Studor ...................... A23F 5/26
99/611
(Continued)

*Primary Examiner* — Jimmy Chou
(74) *Attorney, Agent, or Firm* — Rivka Friedman

(57) ABSTRACT

Exemplary embodiments of the present disclosure are directed towards an automated cooking system comprising of: a an intelligence layer is connected to databases, the databases configured to store various information and the intelligence layer configured to collect and analyze the technical data obtained from modules, a device layer comprises an automated cooking device and a cooking assistance module, cooking assistance module and automated cooking device are configured to retrieve information from databases and a feedback received from cooking assistance module is used to update cooking process, and computing device comprises voice assistant and health monitoring device are connected to the automated cooking device over network, the automated cooking device comprises a curry vessel and an ingredient rack, rice vessel positioned on first induction cooktop and curry vessel positioned on second induction cooktop, first induction cooktop configured for cooking rice and the second induction cooktop configured for curry making.

9 Claims, 18 Drawing Sheets

(51) Int. Cl.
  *A47J 36/32*   (2006.01)
  *A47J 44/00*   (2006.01)
  *A47J 47/01*   (2006.01)
  *A61B 5/00*    (2006.01)
  *G06N 20/00*   (2019.01)
  *H05B 6/06*    (2006.01)

(52) U.S. Cl.
  CPC ............. *A47J 47/01* (2013.01); *A61B 5/4866* (2013.01); *G06N 20/00* (2019.01); *H05B 6/062* (2013.01); *A47J 2027/043* (2013.01); *H05B 2213/07* (2013.01)

(58) Field of Classification Search
  USPC .......................................................... 99/325
  See application file for complete search history.

(56) References Cited

U.S. PATENT DOCUMENTS

| | | | | |
|---|---|---|---|---|
| 9,495,360 | B2* | 11/2016 | Bhatt | G06Q 10/10 |
| 10,177,931 | B2* | 1/2019 | Luckhardt | F24C 15/023 |
| 10,530,866 | B2* | 1/2020 | Boyce | H04L 67/10 |
| 10,839,151 | B2* | 11/2020 | Rapaport | G06F 16/951 |
| 11,622,651 | B2* | 4/2023 | Jung | G06N 3/02 |
| | | | | 426/233 |
| 11,631,010 | B1* | 4/2023 | Redfern | G06N 20/00 |
| | | | | 706/11 |
| 2003/0037681 | A1* | 2/2003 | Zhu | A47J 36/321 |
| | | | | 99/468 |
| 2010/0313768 | A1* | 12/2010 | Koether | A47J 36/321 |
| | | | | 99/325 |
| 2011/0132201 | A1* | 6/2011 | Richardson | F24C 7/08 |
| | | | | 99/325 |
| 2013/0092032 | A1* | 4/2013 | Cafferty | F24C 7/08 |
| | | | | 99/325 |
| 2013/0269538 | A1* | 10/2013 | Minvielle | A23P 10/00 |
| | | | | 99/325 |
| 2014/0137044 | A1* | 5/2014 | Koether | A47J 36/321 |
| | | | | 99/325 |
| 2014/0170275 | A1* | 6/2014 | Bordin | G05B 19/045 |
| | | | | 99/325 |
| 2014/0370167 | A1* | 12/2014 | Garden | A23L 5/15 |
| | | | | 99/325 |
| 2016/0150915 | A1* | 6/2016 | Yu | A47J 27/004 |
| | | | | 426/115 |
| 2016/0174748 | A1* | 6/2016 | Baldwin | A47J 36/321 |
| | | | | 99/330 |
| 2016/0198885 | A1* | 7/2016 | Logan | A47J 27/002 |
| | | | | 99/341 |
| 2016/0299000 | A1* | 10/2016 | Arai | G01G 19/415 |
| 2017/0118167 | A1* | 4/2017 | Subramanya | H04L 63/101 |
| 2017/0139385 | A1* | 5/2017 | Young | G05B 19/042 |
| 2017/0224148 | A1* | 8/2017 | Koennings | G05B 19/0426 |
| 2018/0083833 | A1* | 3/2018 | Zoll | G06F 18/214 |
| 2018/0146811 | A1* | 5/2018 | Grimaldi | A47J 36/00 |
| 2019/0053332 | A1* | 2/2019 | Cheng | F24C 7/046 |
| 2019/0215915 | A1* | 7/2019 | Minvielle | F24C 7/085 |
| 2019/0370883 | A1* | 12/2019 | Koetz | A47J 43/04 |
| 2021/0043108 | A1* | 2/2021 | Baumback | G06F 40/284 |
| 2024/0023751 | A1* | 1/2024 | Takaoka | A47J 27/004 |
| 2025/0089745 | A1* | 3/2025 | Zingfer | A47J 36/321 |

\* cited by examiner

ARTIFICIAL INTELLIGENCE DRIVEN COOKING SYSTEM AND METHODS EMPLOYED THEREOF

CROSS-REFERENCE TO RELATED APPLICATIONS

This continuation-in-part application (CIP) application claims priority benefit of Indian provisional patent application No: 201841014237, filed on 13 Apr. 2018, Indian Non-Provisional Patent Application No: 201841014237, filed on 12 Apr. 2019, and U.S. patent application Ser. No. 16/382,350, entitled "ARTIFICIAL INTELLIGENCE DRIVEN COOKING SYSTEM AND METHODS EMPLOYED THEREOF", filed on 12 Apr. 2019. The entire contents of the patent applications are hereby incorporated by reference herein.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to automated cooking, and more particularly to an artificial intelligence driven cooking system and methods employed thereof.

BACKGROUND

Rapid development through Internet of things and artificial intelligence applied on varied household appliances is a cusp between the quality and speed of life. The conventional systems or devices fail to provide the indigenous taste and hygiene as per the requirement of the user. Cooking as a technology involves step by step procedures with an amalgamation of right ingredients in the right quantity, at the right time and cooked to the right temperature for right period of time.

Existing cooking apparatus lack the capacity to sense and analyse the recipe intended to be cooked. Preliminary steps involving addition of ingredients and regular checks are to be performed by the user to ensure a smooth cooking process to make the recipe palatable, thus questioning the skill of the user. Given the modern day lifestyle attention to fitness goals is equally important, thus making calorific and nutritional values decisive parameters while cooking. Paucity of time is another challenge faced by modern day man and is in need of a cooking system which can cook right and fast. Existing cooking apparatus cannot remotely monitor or start or stop the cooking process. Existing cooking apparatus also cannot measure feedback regarding the completion of the cooking process or the taste of the food.

In the light of aforementioned discussion, there exists a need for a system and method involving the use of automation technology in cooking by the use of artificial intelligence.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An exemplary objective of the present disclosure are directed towards an automated cooking system and method monitored in an artificial intelligence environment based on the cooking directions provided in the user interface.

Yet another exemplary objective of the present disclosure is directed towards implementation of simple, energy saving, and time saving technique.

Yet another exemplary objective of the present disclosure is directed towards customizing recipes in accordance with the taste buds or taste profile of the user.

Yet another exemplary objective of the present disclosure is directed towards recommendation of customized recipes based on health profile of the user.

Yet another exemplary objective of the present disclosure is directed towards measurable feedback regarding the doneness and the taste of the food.

Yet another exemplary objective of the present disclosure is directed towards remotely monitoring or initiating or stopping the cooking process.

Another exemplary objective of the present disclosure is directed towards connecting automated cooking devices over a network that learn from each other and improve efficiency and fine tune cooking parameters.

Another objective of the present disclosure is directed towards automating the cooking operations (for example, weighing, dispensing, sautéing, steaming, simmering, boiling, frying, and stirring) and cooking any recipe which can be cooked using these cooking operations.

Another objective of the present disclosure is directed towards enabling experienced chefs to use semi-automatic assistant mode to control different sections of the appliance, or to cook complex recipes.

Another objective of the present disclosure is directed towards accurately dispensing the right amounts of spices and seasonings depending upon the ingredients that are being used eliminating the guess work of how to make a dish taste good.

Another objective of the present disclosure is directed towards controlling the temperature of the automated cooking device accurately and maintaining the temperature consistently over the period of time.

Another objective of the present disclosure is directed towards steaming the ingredients before sautéing thereby reducing the cooking time.

Another objective of the present disclosure is directed towards dispensing the specific weights of ingredients at specific intervals of time based on the recipe.

Another objective of the present disclosure is directed towards tracking the cooking process continuously to give real time feedback to the cooking assistance module.

Another objective of the present disclosure is directed towards collecting feedback from the users on various factors such as taste, doneness, thickness of the gravy on a scale ranging from 0-5, feedback which is fed in to the machine learning algorithm through the cooking assistance module which retrains to fine tune the cooking parameters as well as a user's taste profile and then updates the cooking assistance module regarding the same to improve the cooking process of the recipes to fine tune the machine learning algorithm's parameters.

Another objective of the present disclosure is directed towards analyzing the user's food consumption and activity levels.

Another objective of the present disclosure is directed towards enabling the users to log and track their nutrient consumption over the period of time.

Another objective of the present disclosure is directed towards connecting the artificial intelligence driven cooking system to cloud database which contains constantly updated and curated set of recipes.

Another objective of the present disclosure is directed towards auto-updating from cloud servers.

Another objective of the present disclosure is directed towards a cooking assistance module is a software that inside an automated cooking device as well as there is the cooking assistance module in connected computing device.

Another objective of the present disclosure is directed towards constant firmware upgrades from servers and from the machines to cloud servers.

Another objective of the present disclosure is directed towards solving mentally taxing aspects of the cooking cycle such as recipe planning or scheduling meals over a week or multiple weeks and auto generate shopping lists that you either purchase or order from one of the supply partners by the user interface of the system.

Another objective of the present disclosure is directed towards scheduling recipes based on dietary restrictions or according to a specific diet like "low carb diet, or high protein diet" etc. and to maintain good nutrient profile over the week.

Another objective of the present disclosure is directed towards filtering recipes and generating pantry list or shopping list based on what is available in home by taking a picture of the ingredients (for example, vegetables) or by scanning a barcode.

Another objective of the present disclosure is directed towards using machine learning techniques to learn the preferences of the user and are able to modify any recipe to match the taste profile of the user.

Another objective of the present disclosure is directed towards reconfiguring recipes and meal plans based on the dietary preferences of the user.

Another objective of the present disclosure is directed towards using machine learning techniques to identify the perfect cooking parameters for a particular recipe.

Another objective of the present disclosure is directed towards using machine learning techniques to identify flavor profiles of a particular region. For example, learn how "Andhra Style" or "Kerala Style" recipes are made i.e. the spice and seasoning combination and then use this to port recipes from one region to another to create novel recipes for example how we can port chicken curry from Andhra style to Kerala style to Rajasthan style etc.

Another objective of the present disclosure is directed towards using machine learning techniques to identify flavor combinations that go together and suggest additions to existing standard recipes to enhance their taste and also to suggest the best replacement for a missing ingredient.

Another objective of the present disclosure is directed towards using machine learning techniques to identify basic cooking process templates.

An exemplary aspect of the present disclosure is directed towards a recipe machine learning module which has multiple programs to analyze the inputs of the data from multiple sources in conjunction to obtain an overview and idea about the doneness of food; a health data machine learning module configured to collect and analyze a health data obtained from the wearable health monitoring device or third party device which, a natural language processing module initiates communication with the user by recognizing the voice of the user for accepting commands and sensor reading and user feedback is feedback for fine tuning the inbuilt algorithms; a plurality of sensors to detect the adequacy of requisite parameters during cooking; and a device layer to retrieve the technical data for preparation of a recipe from the database by the user interface of the system and cooking assistance module.

Another exemplary aspect of the present disclosure is directed towards the artificial intelligence driven cooking system comprising an intelligence layer that is connected to a plurality of databases, the plurality of databases configured to store various information and the intelligence layer configured to collect and analyze the technical data obtained from a plurality of modules.

Another exemplary aspect of the present disclosure is directed towards the artificial intelligence driven cooking system comprising a device layer that comprises an automated cooking device and a cooking assistance module, the cooking assistance module and the automated cooking device are configured to retrieve information from the plurality of databases and the feedback received from the cooking assistance module is used to update the cooking process.

Another exemplary aspect of the present disclosure is directed towards the artificial intelligence driven cooking system comprising a computing device comprises a voice assistant module and a wearable health monitoring devices which are third party devices that are connected to the cooking assistance module over a network and pull in data points to map them against the eating habits, a user's interaction with the automated cooking device is through a touch screen, and the voice recognition feature through the voice assistant module and the wearable health monitoring device or third party device configured to provide the health data to the plurality of modules, the automated cooking device comprises a curry vessel and an ingredient rack, the ingredient rack is configured to hold ingredients that go into the curry vessel and the ingredient rack rotates based on a recipe to dispense the ingredients into the curry vessel at a predetermined interval of time, a rice vessel positioned on a first induction cooktop is configured for rice cooking and passive steaming and the curry vessel positioned on a second induction cooktop is configured for curry making.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION

Figure 1:
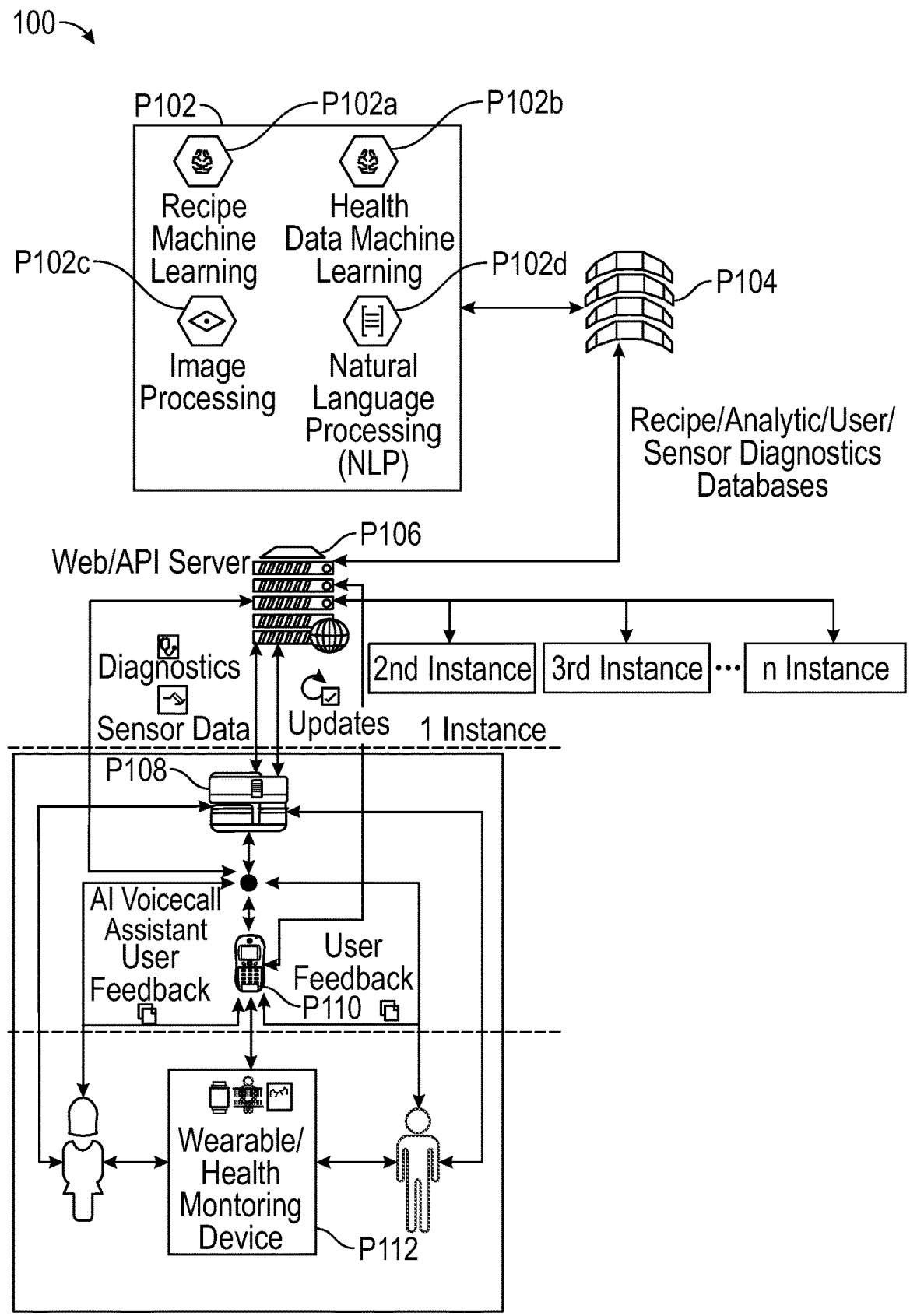
FIG. 1 is architecture for an artificial intelligence driven automated system, according to an exemplary embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1, FIG. 1 is a diagram 100 depicting architecture of an artificial intelligence driven cooking system, according to an exemplary embodiment of the present disclosure. The artificial intelligence driven cooking system 100 may be referred to as system for further reference. The architecture 100's first level is an intelligence layer (P102), and modules such as a recipe machine learning module (P102a), a health data machine learning module (P102b), an image processing module (P102c), and a natural language processing (NLP) module (P102d). The intelligence layer (P102) corresponds to a cloud infrastructure that processes data from the recipe machine learning module (P102a), the health data machine learning module (P102b), the image processing module (P102c), and the natural language processing (NLP) module (P102d). The intelligence layer (P102) is configured to collect and analyze the technical data obtained from the modules such as the recipe machine learning module (P102a), the health data machine learning module (P102b), the image processing module (P102c), and the natural language processing (NLP) module (P102d). The data obtained from multiple sensors is fed into the algorithm to fine tune the machine learning module. These algorithms include but are not limited to, the name and number of ingredients with prescribed quantities, the sequence of adding the ingredients and special requirements like boiling, stirring, and the like. The health data machine learning module (P102b) collects and analyses the health data obtained from the wearable health monitoring device or a third party device (P112) which is worn by the user as an accessory and the user could also manually add the health information on a computing device. The image processing module (P102c) is configured to collaborate with the sensors to determine doneness of food. The image processing module (P102c) comprises of an Infra-red (IR) thermal camera and a high definition (HD) camera. During the process of cooking, the IR thermal camera is configured to generate a heat map of the whole surface where the curry vessel is placed to obtain an image of the whole surface of the vessel. The HD camera works on the principle of obtaining an image of the food being cooked to check the doneness of food. For example: if the command fed through the sensor data is to "fry the onions till they turn brown" then, the HD camera would enable the image processing module to identify the doneness of the onions as per the command through various images generated. The NLP module (P102d) is configured to recognize the speech in the form of user's commands. For example; the user may command rice, or curry depending on the requirement and the NLP module (P102d) executes the command.

The second layer is the information layer which comprises of various databases (P104). The databases (P104) store various information, not limiting to, recipes (which are the system's central data repository) which provide information to the user as per the requirement, user's login information, user's taste profile information, cuisine type, number of persons to be served, information from various sensors like temperature, humidity based on the weight of the ingredients required for a recipe, improvisations suggested for every recipe, and the like. The technical data for preparation of a recipe is stored in the database (P104). The data processing takes place in the cooking assistance module as well as the web-based servers. The recipes may be pre-installed which are configured to be edited and updated as per the requirement of the user. The database (P104) may be expanded depending on the number of recipes added. The recipes may be added by the user, or any person skilled in the art, not limiting to onboard chefs. The cooking assistance module corresponds to an on-device software module which makes automatic cooking happen.

A device layer (P106) consists of the automated cooking device and a cooking assistance module. The information from the database (P104) is retrieved by the user interface of the system and the cooking assistance module. The feedback received from the cooking assistance module is used to update the cooking process and fine tuning of the inbuilt algorithms. This information is provided by streaming data by the cooking assistance module and an application programing interface. The sensor data processing involves various sensors, not limiting to, temperature sensors for real time accurate control of temperature of the cooking tops. Load cells (not shown in the figure) are configured to accurately weigh ingredients and spices. Humidity sensors sense the requisite humidity for cooking. An acoustic sensor is for sensing whether the food is done as per the requirement. A proximity sensor is for detecting the movement of an object and/or a person near the system. It further detects the placement of the pod, i.e. whether a pod is placed in the designated slot, the placement of rice vessels and the curry vessel at their designated slots, an unwanted opening of door, for example the spice rack door and/or the ingredient rack door, and the like. A pressure sensor is configured to detect the pressure maintained in the steamer section of the vegetable steamer which uses the steam to the steam ingredients in the ingredient section.

The user's interaction with the automated cooking device (P108) is through the touch screen; and/or voice recognition feature through a voice assistant module (P110) which may use microphone; and/or through the cooking assistance module. The wearable health monitoring device or third party device (P112) can be connected to the cooking assistance module and the system pulls in the data points. Based on the data generated, an updated recipe and/or diet may be recommended. For example: a low salt recipe for a user with Blood Pressure, a low sugar and/or no sugar recipe for a user with diabetes, or a low-fat diet for a user intending weight loss, and the like. The voice assistant module (P110) and the wearable health monitoring device or third party device (P112) may be configured to guide a user and provide health data via an application programming interface. The third party device (P112) or health monitoring device may include, but not limited to, Amazon Alexa voice Assistant™, Google Devices™, Apple Siri™, Apple Watch™, Samsung Bixby™, fitness monitoring devices, sleep tracking devices, wearable heart monitors, glucose monitors, wearable ECG monitors, wearable blood pressure monitors, biosensors, and the like.

Figure 2:
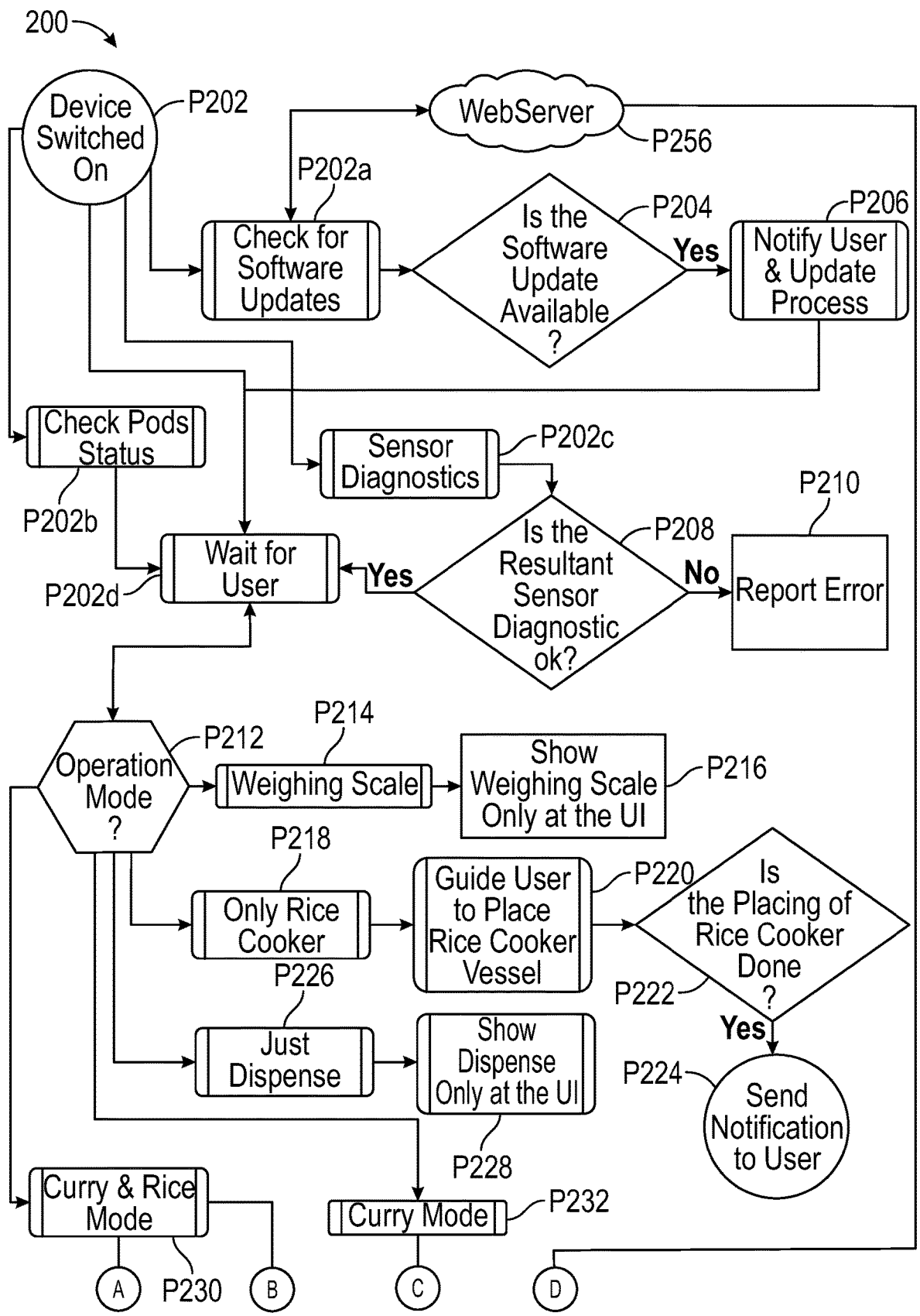
FIG. 2 is a flow diagram depicting an artificial intelligence driven cooking, according to an exemplary embodiment of the present disclosure.
Figure 2:
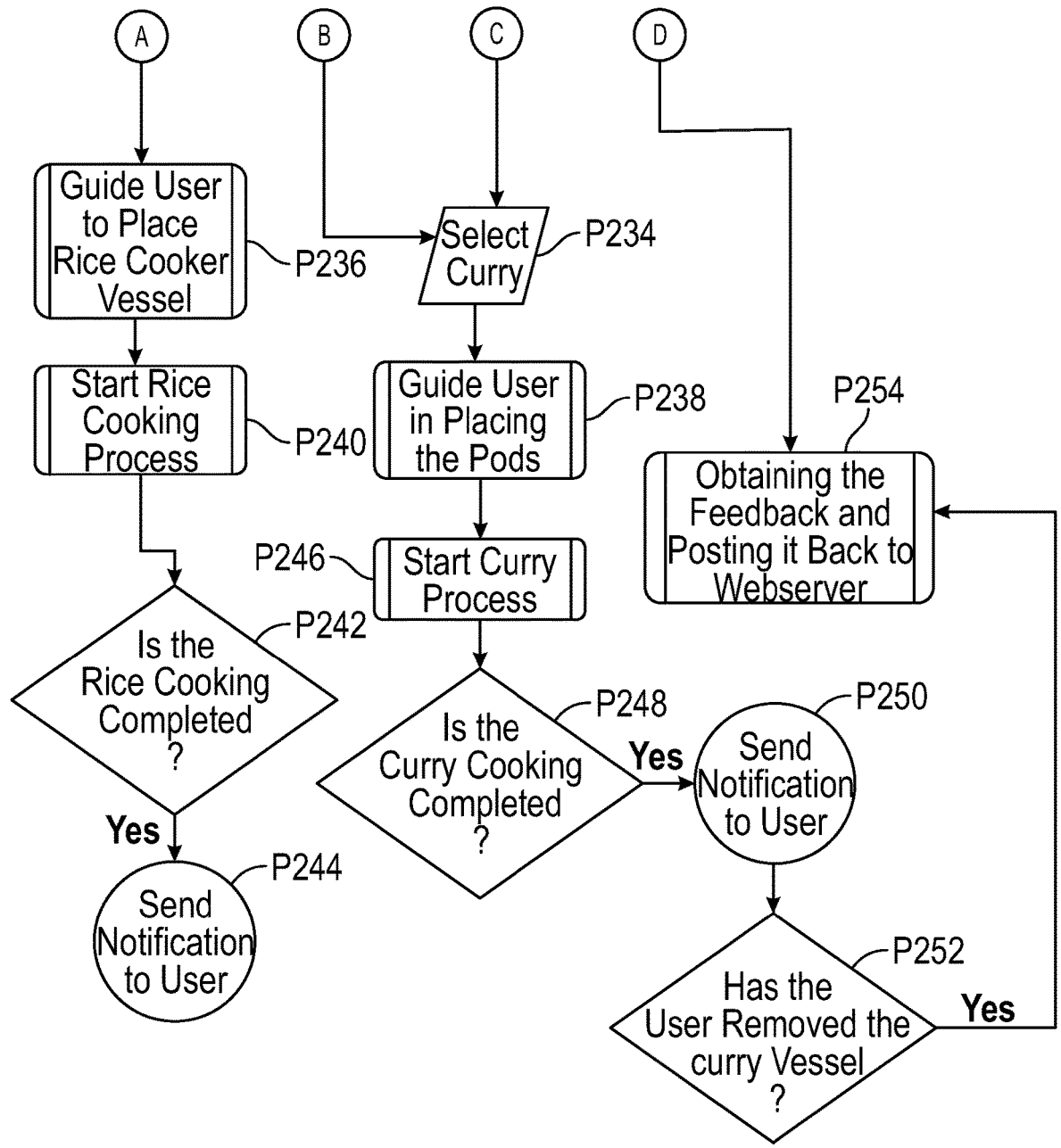

Referring to FIG. 2, FIG. 2 is a flow diagram 200 depicting an artificial intelligence driven cooking, according to an exemplary embodiment of the present disclosure. The user switches on the automated cooking device (P202) for the preparation of desired food. The food prepared may not be limited, to a rice preparation or curry preparation and/or both. Once the automated cooking device is switched on a series of checks are performed, not limiting to, checking for an update of the cooking assistance module (P202a), checking for the status of pods (P202b), where the pods may not be limited to, an oil pod, a water pod, ingredient pods, and the like. The sensor diagnostics is activated (P202c), and the automated cooking device waits for the user (P202d) for performing further operations. It enquires for the availability of any instruction regarding the update of the cooking assistance module (P204), which, when confirmed is notified to the user and the updating process starts (P206). The sensor diagnostics functioning is enquired (P208) and upon confirmation the process continues to step (P202d). An error is reported (P210) upon recognition of error in sensor diagnostics. The user decides on the various operation modes (P212) which are: the weighing scale mode (P214) when activated the user interface depicts an option of displaying only the weighing scale (P216). The weighing scale mode (P214) may act as a standalone mode. Alternatively, an only rice cooker mode (P218) guides the user to place rice cooker vessel (P220), which upon confirmation about placing the rice cooker vessel (P222) is notified to the user (P224). A just dispense mode (P226) may act as a standalone mode which the user interface depicts an option of dispense only (P228). This mode enables the dispensing of a standalone ingredient from the spice rack. Another operation mode viz. curries and rice mode (P230) when opted, guides the user to place the rice cooker vessel on the induction cooktop (P236). If the user prefers to go for a curry mode (P232), then a select curry option (P234) is activated. The select curry option (P234) may also be a continuation step to curries and rice mode (P230). Upon placing the rice cooker vessel the rice cooking process starts (P240). An enquiry (P242) to confirm the completion of rice cooking process is done which results in sending notification to the user (P244). As a continuation to select curry option (P234), the user is guided in placing the vessels on the induction cooktop (P238). The induction cooktop 1 (P236) and induction cooktop 2 (P238) can be used on a standalone mode. The curry preparation process starts (P246) which is enquired for completion (P248). Upon confirmation, the user is notified by sending notification (P250), it is enquired whether the user has removed the vessel in which the curry was cooked (P252), which upon confirmation is prompted for a feedback after sometime and posted (P254) back to the webserver (P256) which is configured to process the requests and feedback obtained from the users that is utilized to recommend customized recipe as per the requirement of the user.

The recipe machine learning module (P102a of FIG. 1) utilizes inputs of the data from multiple sources in conjunction to obtain an overview and idea about the doneness of food. The conjunction involves the images obtained from IR thermal camera, the HD camera, the sensors for sensing humidity and temperatures. Additionally, the sensors can sense the doneness of food through acoustics. For example: The crackling of nuts, splatter of food, popping of seeds, and the like. The learning algorithm is configured to update itself from the updates generated based on the inputs by the user. For example: the updates may be based on the current taste profile of the user which may be updated in the settings. Like the user's taste may be spicy food, less oily, and the like. The learning algorithm updates itself and finds patterns to guess the doneness of food matching the user's taste. The propagated results enable the automated cooking device (P108) to learn and perform in a smart way each time food is intended to be cooked.

Referring to FIG. 3A-3F, FIG. 3A-3F are diagrams 300a-300f depicting various views of the automated cooking device (P108), according to an exemplary embodiment of the present disclosure. FIG. 300a is a three-dimensional view of the automated cooking device. Ingredients rack (P302a) is not limited to, six ingredient pods (P310a). Ingredients other than oils essential for cooking and spices are added to each of these ingredient pods (P310a) and its lid P310c. A spice rack (P304) consists of not limiting to, eight spice pods (P312a) for storing at least eight types of spices, and not limiting to, two oil pods (P328a) for storing oils to be used for cooking. Two different varieties of oils can be accommodated in both the oil pods (P328a) in a given time. The ingredients are weighed in a weighing scale (P306a). The weight of the ingredients depends on the requirements based on the recipe intended to be cooked. A water pod (P308a) is juxtaposed to the ingredients pods (P310a). The water pod (P308a) holds water as added by the user based on the requirement of the user. A curry vessel (P314a) or a rice vessel (P316a) is placed on top of induction cooktop 1 (P320a) or induction cooktop 2 (P322a) based on the requirement of the user. The temperature of the induction cooktops may be controlled through temperature sensors based on the requirement of the recipe. A stirrer (P324a) is positioned above one of the induction cooktop 1 (P320a) or induction cooktop 2 (P322a), aids in blending various flavors and prevents sticking of the ingredients in the vessels by going around them. A vegetable steamer (P318a) is configured to be placed into a rice vessel (P316a). The vegetable steamer (P318a) is covered by a lid (P317a). The vegetable steamer (P318a) is a passive steamer where the vegetables required to be steam cooked are placed in the steamer (P318a) which is in turn placed inside the rice vessel (P316a) on induction cooktop 2 (P322a). The vapors generated are returned to the rice vessel (P316a) or left to the atmosphere. A touch screen (P326a) is the user interface. Various modes for operating the automated cooking device are displayed on the touch screen (P326a) for the user to operate as per the requirement. Two cameras, not limiting to, the IR thermal camera (P332a) and the HD camera (P334a) are located inside the cylindrical section positioned at the center of the stirrer (P324a). An ingredient steamer (350b), not shown herein is an active steamer which is positioned at the back of the curry vessel (P314a) and functions by steaming the ingredients from the ingredients rack (P302a) prior to pushing them into curry vessel (P314a). An example of the same may be steaming of lentils, tubers and the like.

Figure 3A:
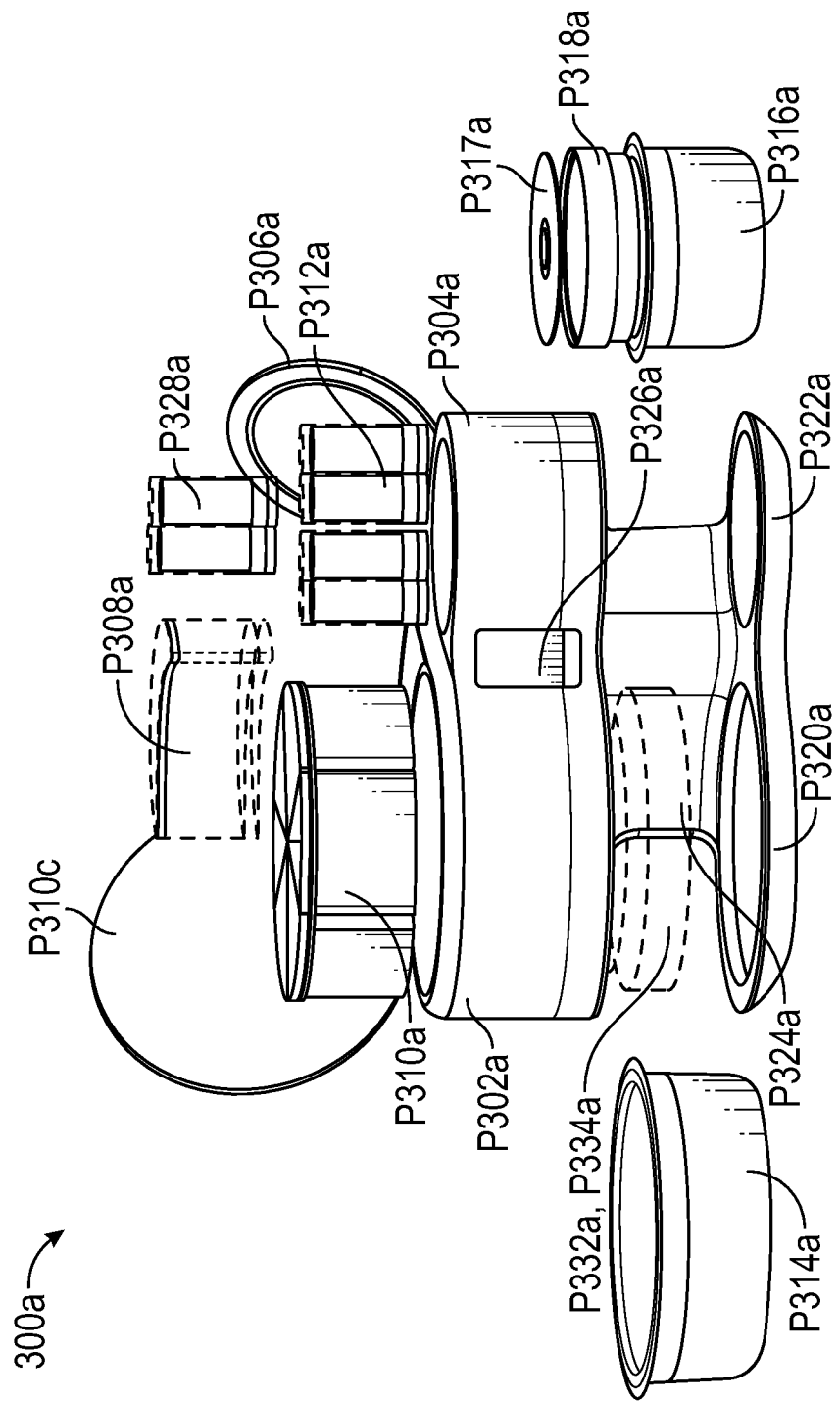
FIG. 3A-3F are diagrams depicting various views of the artificial intelligence driven automated cooking device, according to an exemplary embodiment of the present disclosure.
Figure 3B:
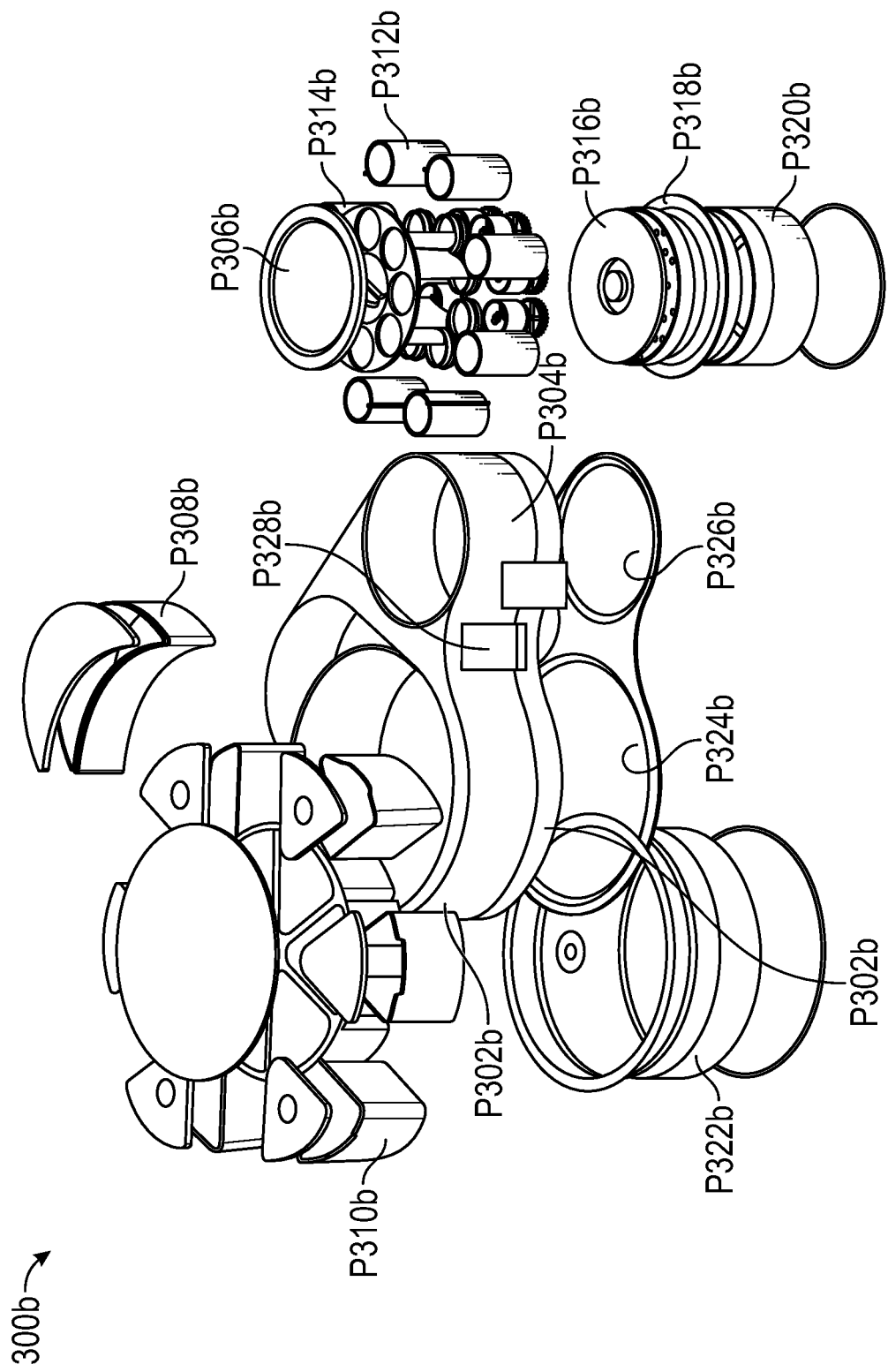

FIG. 3B is a representation 300b, of an exploded view of the automated cooking device, according to an exemplary embodiment of the present disclosure. The FIG. 300b depicts the order and assembly of various sub-parts of the automated cooking device. The ingredients rack is represented as (P302b), the spice rack is represented as (P304b), a lid (P306b) is for closing the racks and the spice pods (P312b) and the oil pods (P314b). The water pod is represented as (P308b) and the ingredient pods as (P310b). A lid (P316b) is for covering the vegetable steamer (P318b) which may be placed inside the rice vessel (P320b). The curry vessel is represented as (P322b). The induction cooktops are represented as (P324b) and (P326b), and the user interface which is the touch screen is represented as (P328b).

Figure 3C:
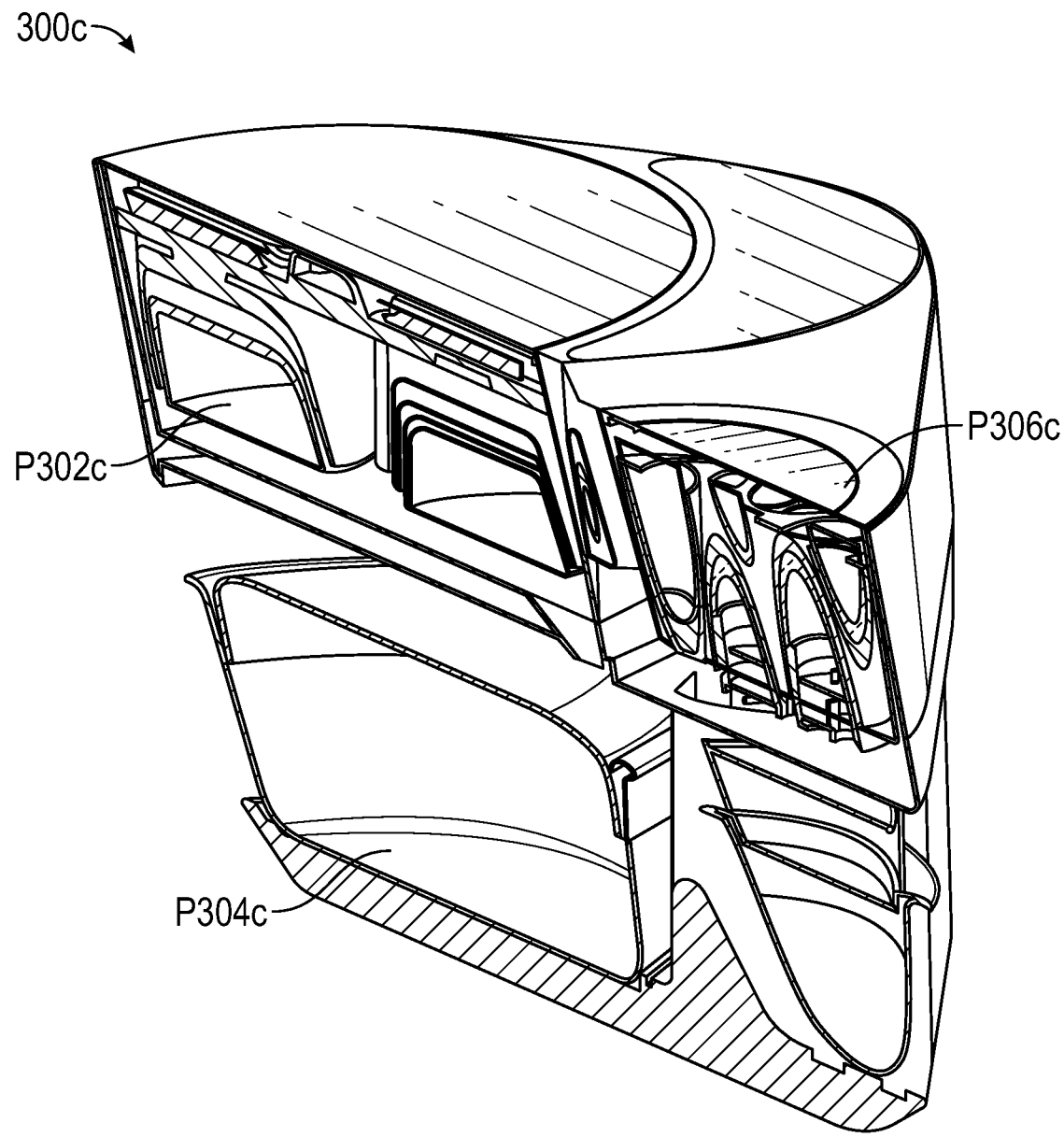

FIG. 3C is a cross sectional view 300c, of the automated cooking device, which depicts the lengthwise and breadthwise view of various parts of the automated cooking device, according to an exemplary embodiment of the present disclosure. The ingredient pods are represented as (P302c). The induction cooktop is represented as (P304c) on which the rice vessel and/or vessel rests for cooking. The lid (P306c) is for covering the spice pods and/or oil pods placed in the spice rack.

Figure 3D:
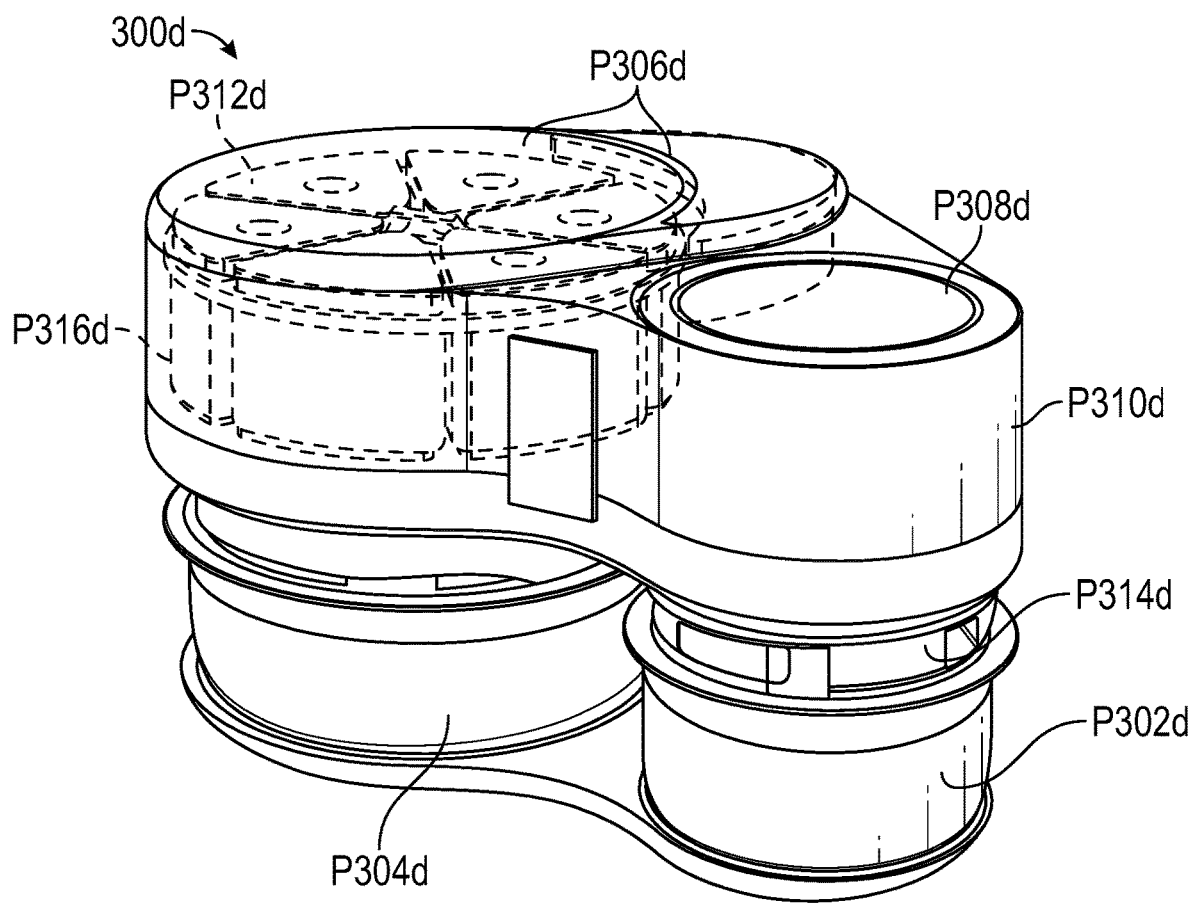

FIG. 3D is the top view 300d, of the automated cooking device, according to an exemplary embodiment of the present disclosure. The view depicts a top cover for the automated cooking device. The rice vessel is represented as (P302d) and the curry vessel as (P304d). The lid (P306d) is placed on top of the ingredient pods (P312d) which are housed inside the ingredients rack (P316d). The lid (P308d) is for covering the spice rack (P310d). A vegetable steamer is represented as (P314d).

Figure 3E:
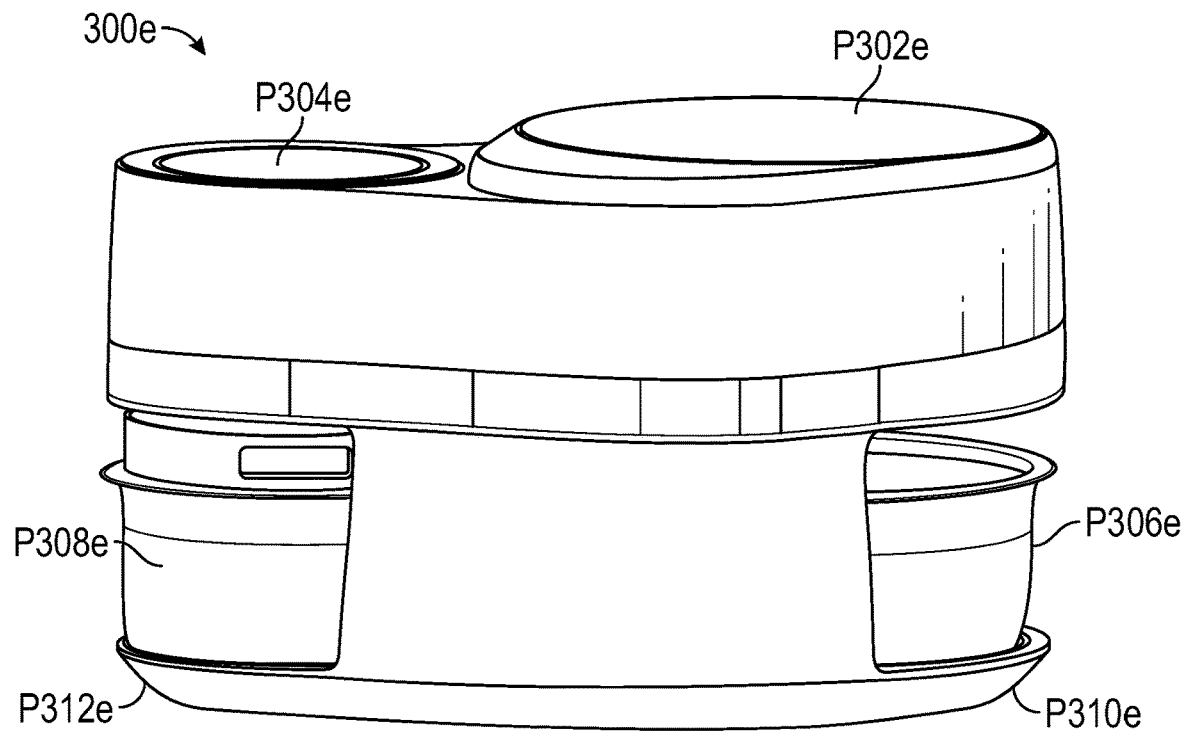

FIG. 3E depicts the back side view 300e, of the automated cooking device, according to an exemplary embodiment of the present disclosure. The lid on ingredients rack is represented as (P302e) and the lid on spice rack is represented as (P304e). The rice vessel is represented as (P308e) and the curry vessel is represented as (P306e). The induction cooktop placed below the rice vessel (P308e) is represented as (P312e) and the induction cooktop placed below the curry vessel (P306e) is represented as P310e.

Figure 3F:
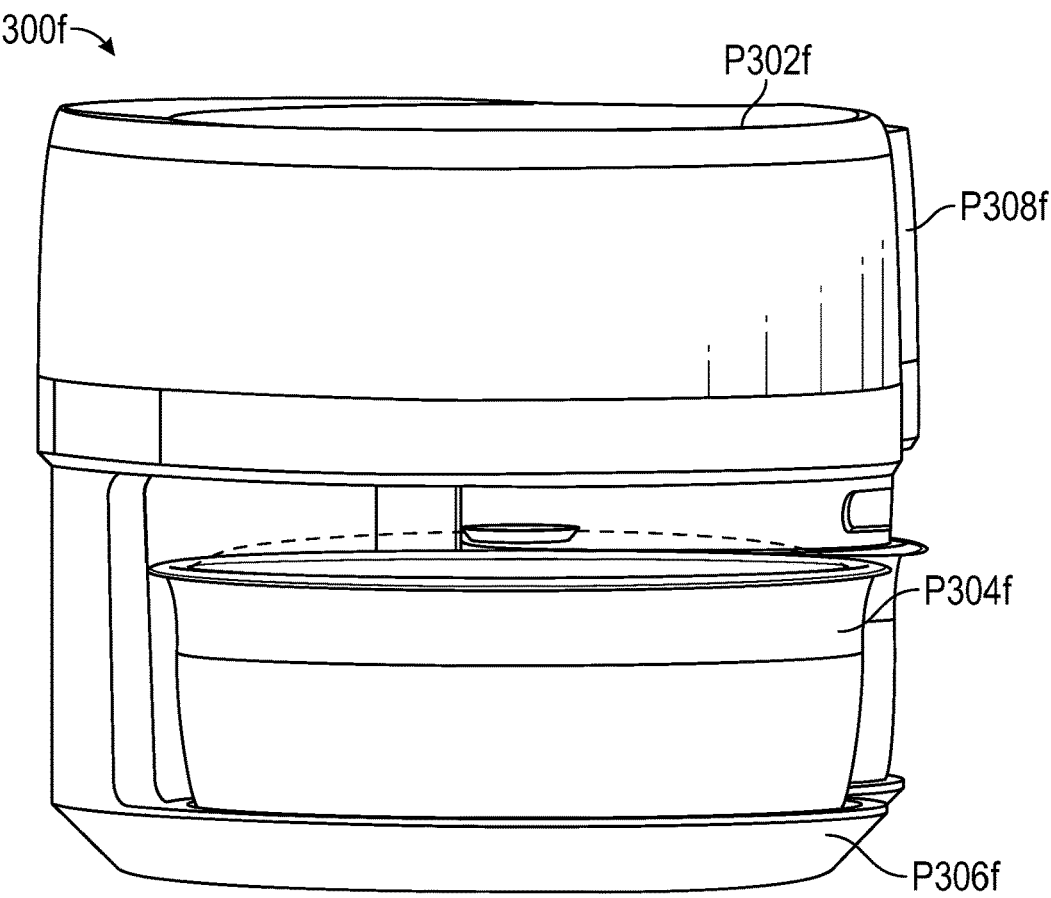

Referring to FIG. 3F depicts the left sided view 300f, of the automated cooking device, according to an exemplary embodiment of the present disclosure. The lid (P3020 is for covering the spice rack (P3080. The rice vessel (P3040 is placed on the induction cooktop (P3060.

The mechanism involved in the functioning of the parts in the FIG. 300b-3000 is similar to the description in FIG. 300a.

Figure 4:
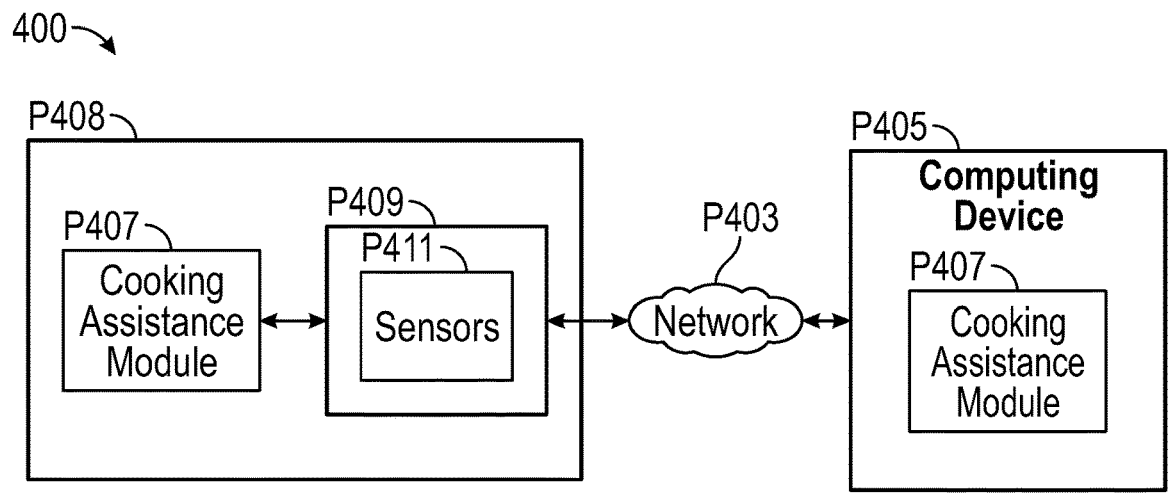
FIG. 4 is a block diagram depicting a device layer, according to an exemplary embodiment of the present disclosure.

Referring to FIG. 4, FIG. 4 is a block diagram 400 depicting a device layer, according to an exemplary embodiment of the present disclosure. The device layer 400 comprises an automated cooking device (P408), a network (P403), and a computing device (P405). The automated cooking device (P408) is connected to the computing device (P405) over the network (P403). The network (P403) may include but is not limited to, an Internet of things (IoT network devices), an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or cellular data service, a RFID module, a NFC module, wired cables, such as the worldwide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML, data from an HTTP address, then traversing the XML, for a particular node) and so forth without limiting the scope of the present disclosure. The computing device (P405) comprises a cooking assistance module (P407).

The automated cooking device (P408) comprises the cooking assistance module (P407), and a processing device (P409). The processing device (P409) comprises sensors (P411). The processing device (P409) may include but not limited to, a microcontroller (for example ARM 7 or ARM 11), a raspberry pi3 or a Pine 64 or any other 64 bit processor which can run Linux OS, a microprocessor, a digital signal processor, a microcomputer, a field programmable gate array, a programmable logic device, a state machine or logic circuitry, Arduino board. The sensors (P411) comprise temperature sensors, humidity sensors, an acoustic sensor, a pressure sensor, a proximity sensor, and so forth. The temperature sensors are configured for real time accurate control of temperature of the induction cooktops. The humidity sensors are configured to maintain required humidity. The acoustic sensor is configured to sense spices crackle. The pressure sensor is configured to detect the pressure maintained in the steamer which steams the ingredients. The proximity sensor is configured for detecting the movement of an object and/or a person near the automated cooking device (P408). The proximity sensor further detects the placement of the pod, i.e. whether a pod is placed in the designated slot, the placement of rice vessels and the curry vessel at their designated slots, an unwanted opening of door, for example the spice rack door and/or the ingredient rack door, and the like. A pressure sensor is configured to detect the pressure maintained in the steamer section of the vegetable steamer which uses the steam to the steam ingredients in the ingredient section.

Although the computing device (P405) is shown in FIG. 4, an embodiment of the environment may support any number of computing devices. The computing device (P405) may include, but are not limited to, a desktop computer, a personal mobile computing device such as a tablet computer, a laptop computer, or a netbook computer, a smartphone, a video game device, a digital media player, a piece of home entertainment equipment, backend servers hosting database and other software, and the like. Each computing device supported by the environment is realized as a computer-implemented or computer-based device having the hardware or firmware, software, and/or processing logic needed to carry out the intelligent messaging techniques and computer-implemented methodologies described in more detail herein. The computing device (P405) may be configured to display features by the cooking assistance module (P407).

The computing device (P405) may include a cooking assistance module (P407), which is accessed as a mobile application, web application, software that offers the functionality of accessing mobile applications, and viewing/processing of interactive pages, for example, are implemented in the computing device (P405) as will be apparent to one skilled in the relevant arts by reading the disclosure provided herein. The cooking assistance module (P407) may be downloaded from the cloud server (not shown). For example, the cooking assistance module (P407) may be any suitable application downloaded from GOOGLE PLAY® (for Google Android devices), Apple Inc.'s APP STORE® (for Apple devices), or any other suitable database. In some embodiments, the cooking assistance module (P407) may be software, firmware, or hardware that is integrated into the computing device (P405). The cooking assistance module (P407) may be an artificial intelligence powered, needs-based, social networking service to enable real-time conversations (for example, voice conversations) between the users and automated cooking device (P408). Users request the cooking assistance module (P407) for a connection from the computing device (P405) based upon their interests or a need they have at any given time.

The cooking assistance module (P407) is configured allow the users to add or edit or modify or customize recipes. The users schedule or plan recipes based on filters. The cooking assistance module (P407) is also configured to generate shopping lists based on the meal plan. The cooking assistance module (P407) is also configured to enable the user to track cooking status and also provide a live view panel to see the status of the cooking process. The cooking assistance module (P407) is also comprises a control panel which acts as a remote control to the automated cooking device (P408). The user selects a recipe either on the automated cooking device (P408) screen or the cooking assistance module (P407).

Figure 5:
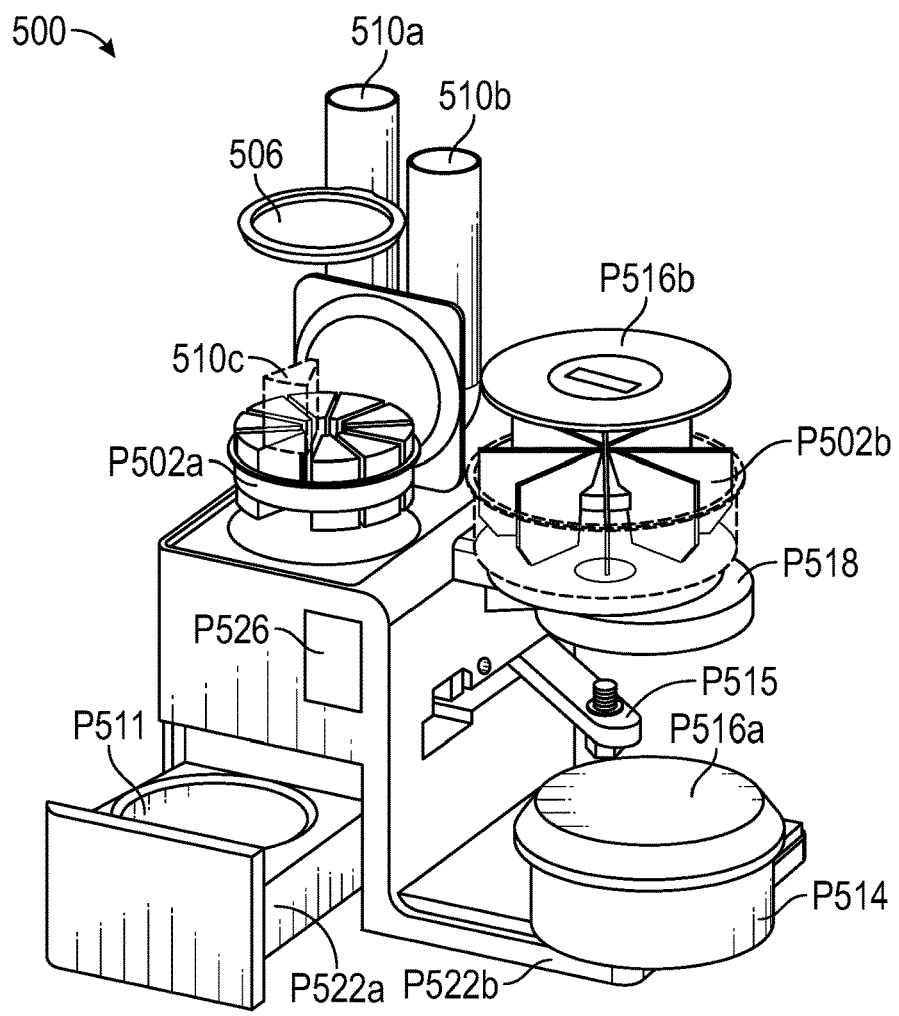
FIG. 5 is a diagram depicting an embodiment of automated cooking device (P408) as shown in FIG. 4, according to an exemplary embodiment of the present disclosure.

Referring to FIG. 5, FIG. 5 is a diagram 500 depicting an embodiment of automated cooking device (P408) as shown in FIG. 4, according to an exemplary embodiment of the present disclosure. FIG. 500 is a three dimensional view of the automated cooking device. The automated cooking device (P408) comprises pods (P510a, P510b, P510c), a weighting scale (P506), a first rack (P502a), a second rack (P502b), a touch screen (P526), a rice vessel (P511), a first induction cooktop (P522a), a second induction cooktop (P522b), a steamer (P518), a mechanical arm (P515), a vessel Lid (P516a), a rack lid (P516b), and a curry vessel (P514).

The pod (P510a) for storing oils to be used for cooking. Two different varieties of oils can be accommodated in the oil pods in a given time. The ingredients are weighted in the weighing scale (P506). The weight of the ingredients depends on the requirements based on the recipe intended to be cooked. The water pod (P510b) is juxtaposed to the ingredients pod (P510c). The water pod (P510b) holds water as added by the user based on the requirements of the user. Ingredients other than oils essential for cooking and spices are added to each of these ingredient pods (P510c). Various modes for operating the automated cooking device (P408) are displayed on the touch screen (P526) for the user to operate as per the requirement. A rice vessel (P511) or a curry vessel (P514) (for example, curry vessel) is placed on top of first induction cooktop (P522a) or second induction cooktop (522b) based on the requirement of the user. The temperature of the induction cooktops (P522a or P522b) may be controlled through temperature sensors based on the requirement of the recipe. The steamer (P518) is configured to be placed into the curry vessel (P514). The passive steaming may happen inside the rice vessel (P511). The active steamer (P518) is in the bottom section of the second rack (P502b) and may steam vegetables that go into the curry inside the curry vessel (P514) on the second induction cooktop (P522b). The vessel lid (P516a) has a section of it which can be opened or closed to simulated open and closed lid cooking additions. The vessel lid (P516a) is configured for covering the curry vessel (P514). The vapours generated are returned to the curry vessel (P514) on the second induction cooktop (P522b). Various modes for operating the automated cooking device (P408) are displayed on the touch screen (P508) for the user to operate as per the requirement. The mechanical arm (P515) which acts a base to the second rack (P502b), holds the mechanism to rotate the second rack (P502b) and also rotate the stirrer. The mechanical arm (P515) is foldable into the main frame so the user can use the induction cooktop (P522a or P522b) in a standalone mode. The rack lid (P516b) is configured to cover the second rack (P502b).

The automated cooking device (P408) is configured to show what ingredients are needed and checks if the ingredients available in the pantry-which lets the user to either use them or get them from the store. The automated cooking device (P408) runs a status cycle to check the levels of liquids and condiments. The automated cooking device (P408) is also configured to check if all the required condiments for the particular recipe are present in the first rack (P502a). The first rack (P502a) may be represented as the condiments rack. If not present or levels are low the interface guides the user to either replace or refill the pods (P510a, P510b, P510c). The user is guided in the interface to weigh and place the perishable ingredients in to the second rack (P502b) sequentially. The second rack (P502b) may be represented as the ingredient rack. Once all the ingredients are loaded the automated cooking device (P408) starts the operations based on whether it is in fully automatic or semi-automatic mode. In fully automatic mode, the automated cooking device (P408) executes the recipe step by step by controlling the induction cooktop (P522) temperature continuously using the feedback from the sensors. The sensors may include, but are not limited, an image sensor, thermal sensor (top and bottom), humidity sensor, and so forth.

Figure 6:
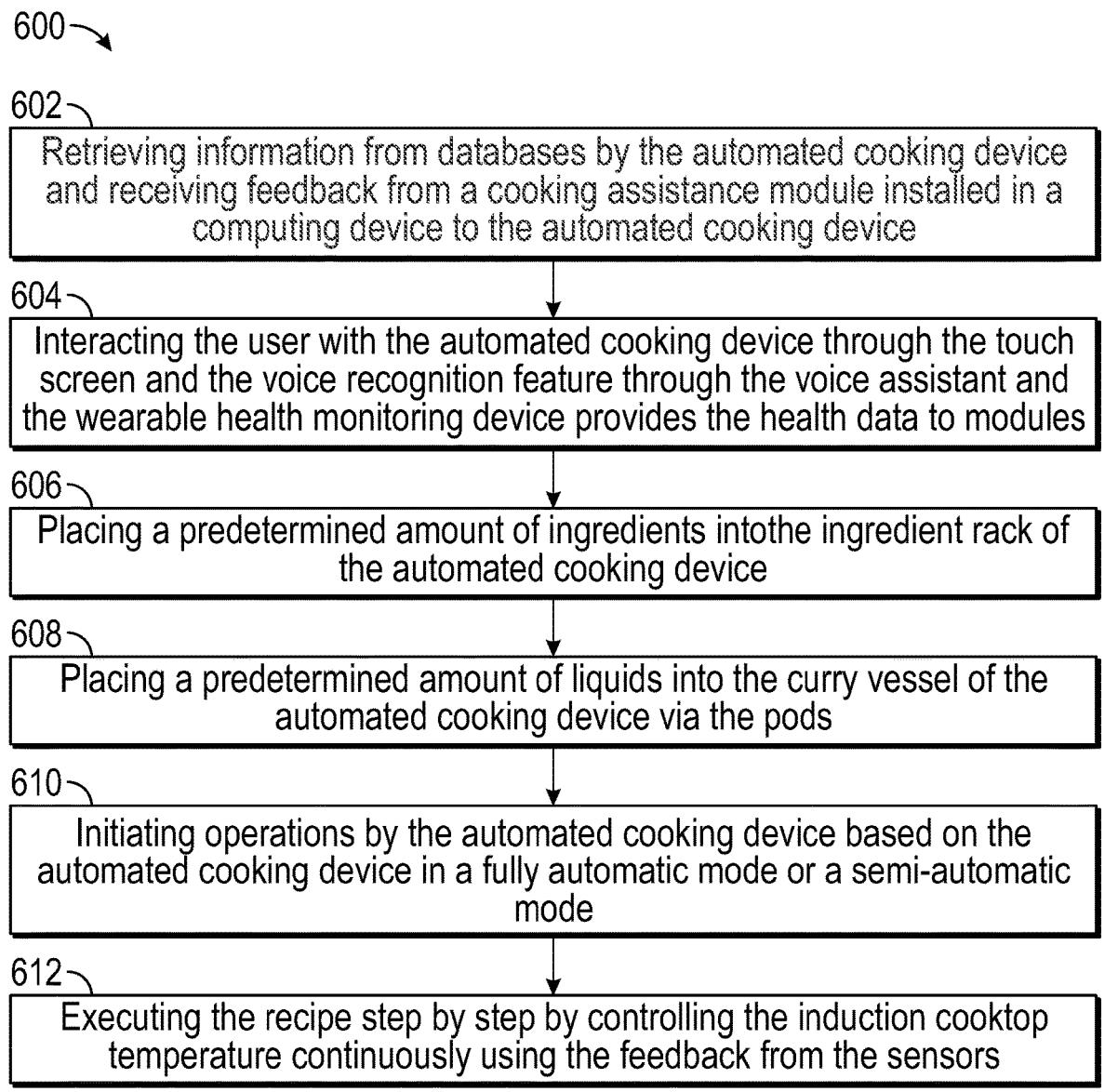
FIG. 6 is a flow chart depicting a method for initiating operations of the automated cooking device, according to an exemplary embodiment of the present disclosure.

Referring to FIG. 6, FIG. 6 is a flow chart 600 depicting a method for initiating operations of the automated cooking device, according to an exemplary embodiment of the present disclosure. As an option, the method 600 is carried out in the context of the details of FIG. 1, FIG. 2 FIG. 3A, FIG. 3B, FIG. 3C, FIG. 3D, FIG. 3E, FIG. 3F, FIG. 4, and FIG. 5. However, the method 600 is carried out in any desired environment. Further, the aforementioned definitions are equally applied to the description below.

The method commences at step 602, retrieve information from databases by the automated cooking device and receive feedback from a cooking assistance module installed in the computing device to the automated cooking device. Thereafter, at step 604, interact the user with the automated cooking device through the touch screen and the voice recognition feature through the voice assistant and the wearable health monitoring device provides the health data to modules. Thereafter, at step 606, a predetermined amount of ingredients is placed into the ingredient rack of the automated cooking device. The automated cooking device comprises the ingredient steamer which is positioned below the ingredient rack which steams the ingredients before sautéing thereby reducing the cooking time and pushing the ingredients into the curry vessel. Thereafter, at step 608, a predetermined amount of liquids is placed into the curry vessel of the automated cooking device via the pods. Thereafter, at step 610, the automated cooking device initiates operations based on the automated cooking device in a fully automatic mode or a semi-automatic mode. Thereafter, at step 612, the automated cooking device executes the recipe step by step by controlling the induction cooktop temperature continuously using the feedback from the sensors.

Figure 7:
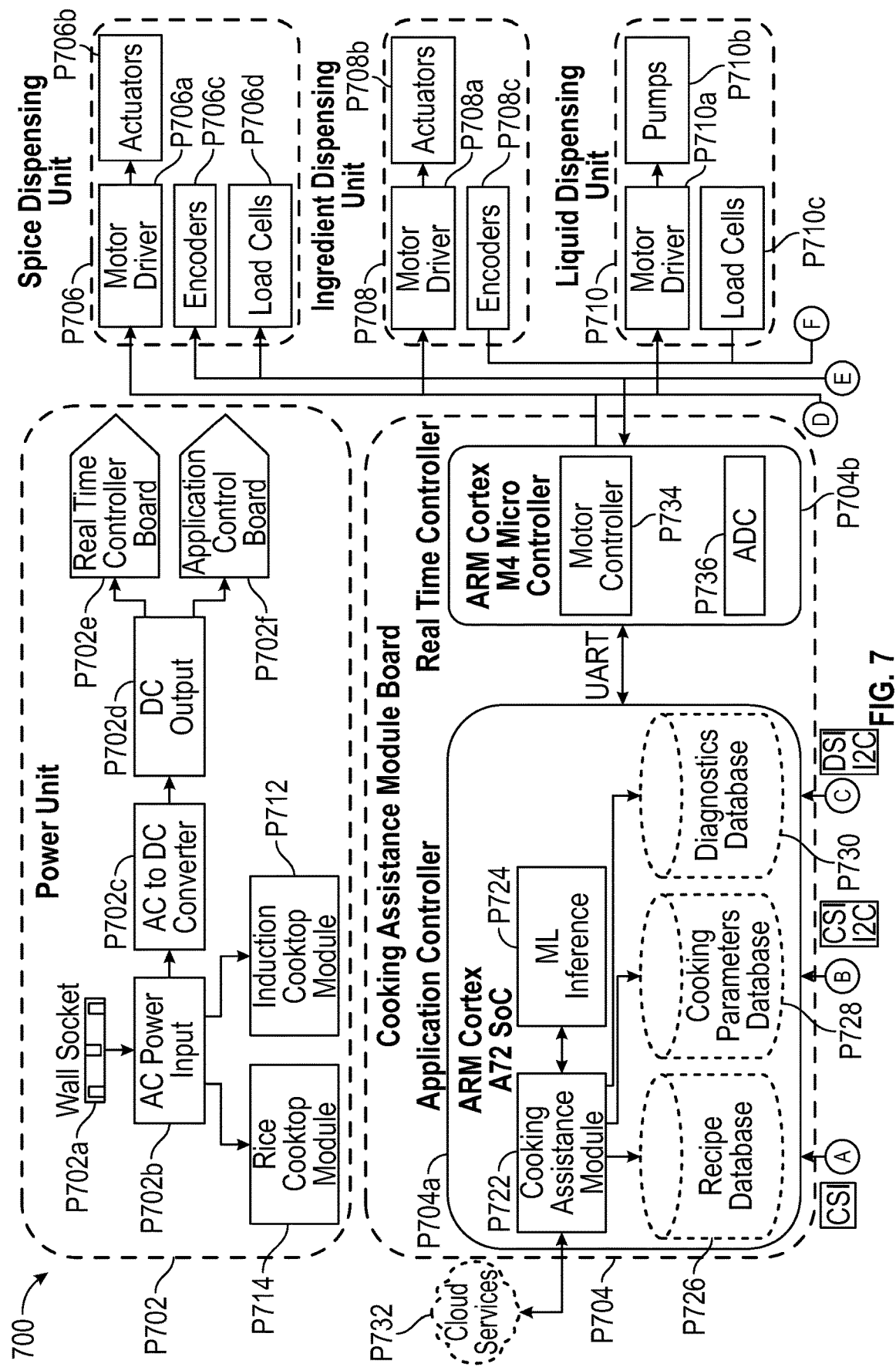
FIG. 7 is an example diagram depicting an embodiment of an automated cooking device, in accordance with one or more exemplary embodiments.
Figure 7:
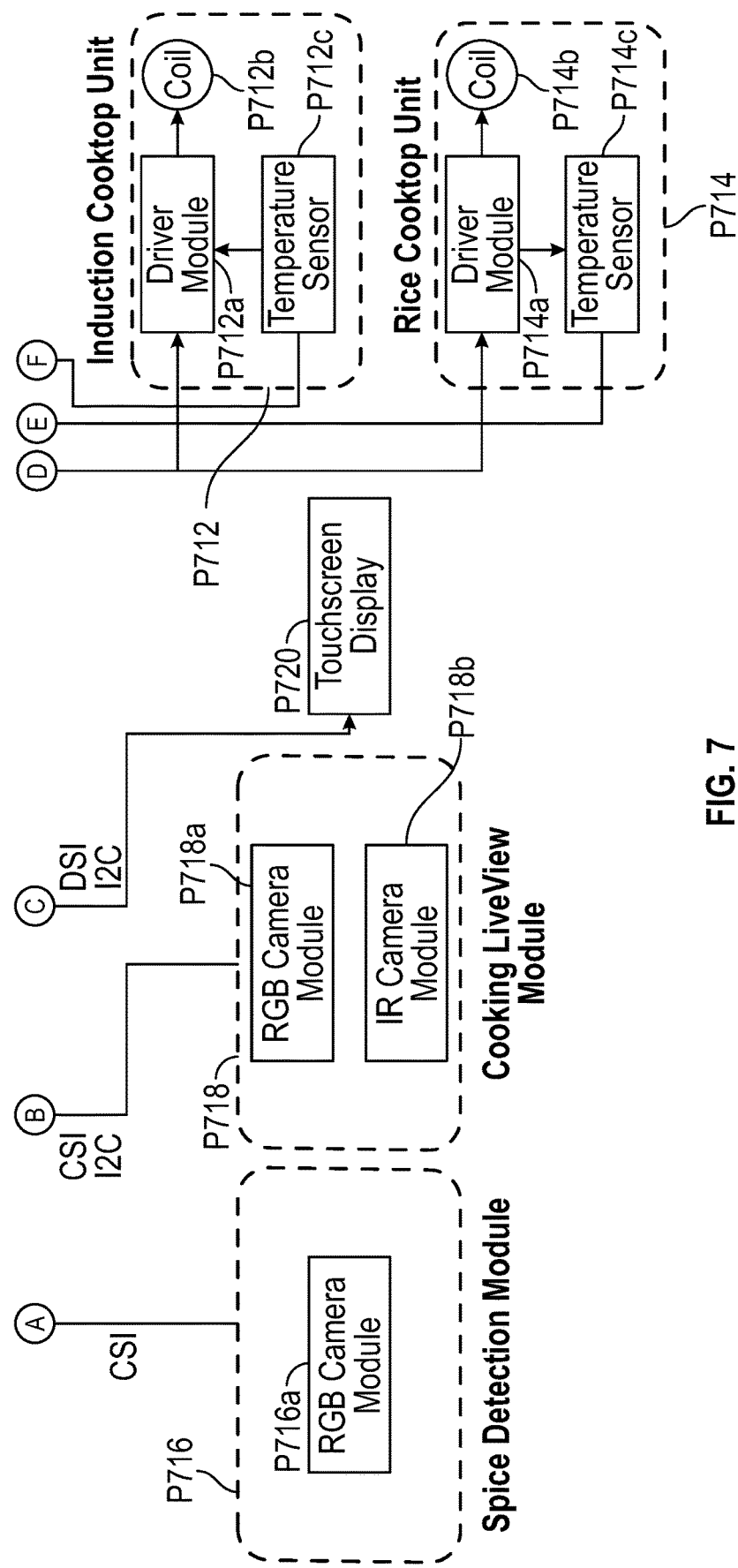

Referring to FIG. 7, FIG. 7 is an example diagram 700 depicting an embodiment of an automated cooking device, in accordance with one or more exemplary embodiments. The automated cooking device 700 includes a power unit (P702), a cooking assistance board (P704), a spice dispensing unit (P706), an ingredient dispensing unit (P708), a liquid dispensing unit (P710), an induction cooktop unit (P712), a rice cooktop unit (P714), a spice detection module (P716), a cooking live view module (P718), and a touchscreen display (P720). The power unit (P702) further includes a wall socket P702*a*, an AC power input (P702*b*), an AC to DC converter (P702*c*), a DC output (P702*d*), a real time controller board (P702*e*), an application controller board (P7020, a rice cook top unit (P714), and an induction cook-top unit (P712). The cooking assistance module board (P704) includes an application controller (P704*a*), and a real-time controller (P704*b*). The application controller (P704*a*) includes the cooking assistance module (P722), a machine learning interface (P724), a recipe database (P726), a cooking parameters database (P728), a diagnostics database (P730), and a cloud services platform (P732).

In accordance with one or more exemplary embodiments of the present disclosure, the AC power input (P702*b*) may be pivotally connected to the wall socket P702*a* for providing an electrical power supply to the rice cook top unit (P714) and the induction cook top unit (P712). The AC-DC converter (P702*c*) may include a bi-directional power stage that processes energy from the AC power input (P702*b*) to a passive DC load is provided. The DC output (P702*d*) may be provided to the real time controller board (P702*e*), and the application controller board (P702*f*).

The application controller (P704*a*) includes the cooking assistance module (P722), the machine learning interface (P724), the recipe database (P726), the cooking parameters database (P728), the diagnostics database (P730), and the cloud services platform (P732). The cooking assistance module (P722) from the application controller (P704*a*) may be configured to communicate with the recipe database (P726), the cooking parameters database (P728), and the diagnostics database (P730). The machine learning interface (P724) may be configured to enable the users to submit respective requests for several tasks of a machine learning workflow, such as tasks for extracting records from the recipe database (P726), and the cooking parameters database (P728), and the diagnostics database (P730). The recipe database (P726) holds all the recipe information like the title, description, ingredients, recipe instructions, nutritional value, tools needed, reviews, rating, flavour profile images, etc. The recipe database (P726) holds the public recipes accessible by all users which are generated by the company, various chefs, and users as well as the private recipes generated by individual users. The recipe database (P726), the cooking parameters database (P728), the diagnostics database (P730) may be configured to provide the necessary information for the cooking assistance module (P722) with the recipe instructions needed for the selected recipe. The recipe database (P726), the cooking parameters database (P728), the diagnostics database (P730) may be synced periodically with the cloud services platform (P732). The cloud services platform (P732) may include, but not limited to, public cloud services, and the like. The cooking assistance module (P722) corresponds to the on-device software module which makes the automatic cooking happen. The cooking assistance module (P722) may be configured to interact with the spice dispensing unit (P706), the ingredient dispensing unit (P708), the liquid dispensing unit (P710), the induction cooktop unit (P712), the rice cooktop unit (P714), the spice detection module (P716), the cooking live view module (P718), and the touchscreen display (P720) to receive sensor information, the cooking assistance module (P722) processes the information and takes a decision for the future process, and then the cooking assistance module (P722) issues commands to the various hardware sub-units to execute them. Furthermore, the cooking assistance module (P722) interacts with cloud services, and the touchscreen display (P720).

In accordance with one or more exemplary embodiments, the cooking parameters database (P728) may be configured to hold parameters that are necessary for performing the cooking actions. These actions may include, but not limited to, smoking points of various oils, cooking temperatures of various ingredients, cooking parameters of various cooking methods like saute, boil, deep fry, and the like. The cooking parameters database (P728) also holds the information of the current spices and liquids in the machine their levels as well as their configuration like water or oil levels, position of the spice pod for example: salt and its current level in the machine. The cooking parameters database (P728) may be also configured to provide the cooking assistance module (P722) with the parameters needed to translate a recipe instruction to machine executable form. The cooking parameters database (P728) may be configured to store cooking preferences of the users. The cooking parameters database (P728) may be synced periodically with the cloud services platform (P732). The diagnostics database (P730) may be configured to hold the information that is generated by the device through temperature sensors, camera, touchscreen, load cell, pressure sensor, microphone as well as various user interactions during the cooking process. The device periodically upload the information to the cloud services platform (P732) where the machine learning uses the information to train the machine learning models to improve and fine tune the cooking process and also to detect any anomalies in the machine, which may help the user to identify any malfunctions pre-emptively.

In accordance with one or more exemplary embodiments of the present disclosure, the real-time controller (P704*b*) may be an ARM cortex M4 microcontroller. The real-time controller (P704*b*) may include motor controllers (P734) and the analog-to-digital converter (P736). The motor controllers (P734) may be configured to receive cooking information from the application controller (P704*a*) through a universal asynchronous receiver or transmitter. Analog outputs from the spice dispensing unit (P706), the ingredient dispensing unit (P708), the liquid dispensing unit (P710), the induction cooktop unit (P712), the rice cooktop unit (P714) may be passed through the analog-to-digital converter (P736) and read by the real-time controller (P704*b*). The spice detection module (P716) may include a RGB (red, blue, green) camera (P716a) configured to identify the type of spice in the spice pod by scanning the QR code on the spice pod, as well as measure the level of spice in the spice pod through image processing. The cooking live view module (P718) may include the RGB camera module (P718a) and an infrared (IR) thermal camera module (P718b). The IR thermal camera is configured to a heat map of the whole surface where the curry vessel is placed to obtain an image of the whole surface of the vessel. The RGB camera module (P718a) and the infrared (IR) thermal camera module (P718b) may be configured to provide cooking live view to the user. The touchscreen display (P720) may be separated from or integrated to the cooking assistance board (P704). The touchscreen display (P720) may be configured to output display information. The display information may provide a graphical user interface.

The spice dispensing unit (P706) may include a motor driver (P706a), actuators (P706b), encoders (P706c), and load cells (P706d). The motor driver (P706a) and the actuators (P706b) may be configured to control the spice dispensing unit (P706) and the motor driver (P706a) may include a smoothing capacitor and is configured to direct current power supplied from a battery to the spice dispensing unit (P706). The encoders (P706c) may be configured to send a feedback signal that may be used to determine position, count, speed or direction of the spice dispensing unit (P706). The load cells (P706d) may be configured to accurately weigh spices. The ingredient dispensing unit (P708) may include the motor driver (P708a), the actuators (P708b), and the encoders (P708c). The motor driver P708a and the actuators (P708b) may be configured to control the ingredient dispensing unit P708. The encoders (P708c) may be configured to send a feedback signal that may be used to determine position, count, speed or direction of the ingredient dispensing unit (P708).

The liquid dispensing unit (P710) may include motor drivers (P710a), pumps (P710b), and the load cells (P710c). The motor driver (P710a) may be configured to control the liquid dispensing unit (P710). The pumps (P710b) may be configured to dispense the liquids into the curry vessel via pods. The motor drivers (P710a) may be configured to move the fluids form the liquid pods to the curry vessel through the pipes based on the commands received from the cooking assistance module (P722). The load cells (P710c) may be configured to provide real time measurement of the weight of the liquid pods to the cooking assistance module (P722), the weight of the liquid pods may be used as feedback for the liquid dispensing process. The load cells (P710c) may be configured to accurately weigh liquids. Furthermore, the induction cooktop unit (P712) may include driver (P712a), a coil (P712b), and a temperature sensor (P712c). The driver (P712a) is used to run an alternating current into the coil (P712b), which results in an oscillating magnetic field which in turn induced a magnetic flux in the curry vessel, producing eddy current in the ferrous curry vessel resulting in it heating up. The driver (P712a) uses the feedback from the temperature sensor (P712c) to control the induction to maintain a set temperature point. The temperature sensor (P712c) may be configured for real time accurate control of temperature of the induction cooktops. The induction cooktop unit (P712) has a self-contained driver unit circuit which energizes the induction coil (P712b) to maintain the cooking vessel at a certain temperature or a power level for the defined amount of time, the temperature sensor (P712c) which gives real time feedback on the temperature of the cooking vessel. The induction cooktop unit (P712) may also be configured to detect if the vessel is present or not. The cooking assistance module (P722) may be configured to issue commands to the induction cooktop unit (P712) to on/off, maintain temperature and power levels for a specific duration, based on the cooking step. The rice cooktop unit (P714) may include the driver (P714a), the coil (P714b), and the temperature sensor (P714c). The driver (P714a) is used to run an alternating current into the coil (P714b), which results in an oscillating magnetic field which in turn induced a magnetic flux in the curry vessel, producing eddy current in the ferrous curry vessel resulting in it heating up. The driver (P714a) uses the feedback from the temperature sensor (P714c) to control the induction to maintain a set temperature point. The temperature sensor (P714c) may be configured for real time accurate control of temperature of the rice cooktops. The cooking assistance module (P722) may be configured to issue commands to the rice cooktop unit (P714) to on or off, maintain temperature and power levels for a specific duration, based on the cooking step.

Figure 8:
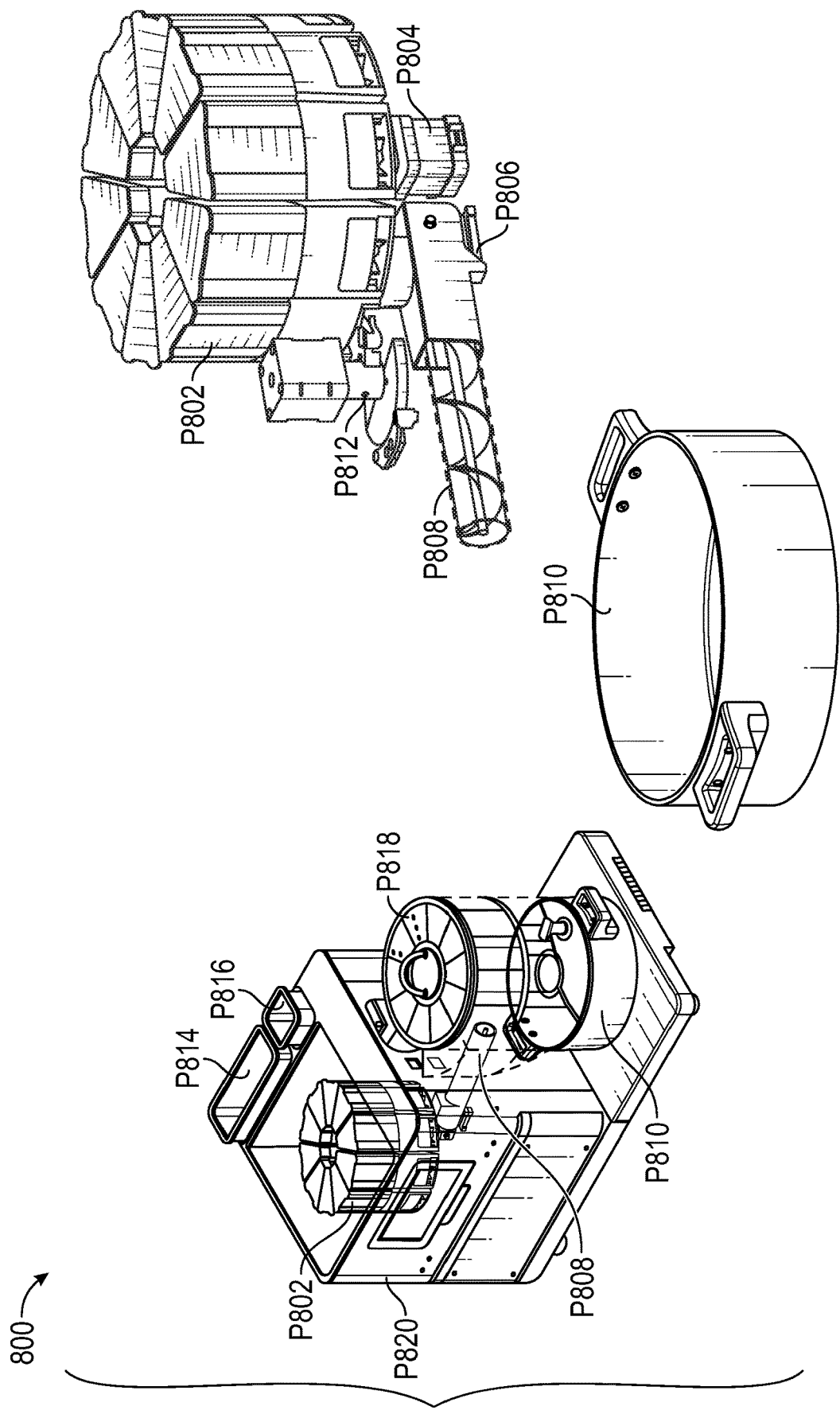
FIG. 8 is a diagram depicting an embodiment of spice or condiments dispensing device, in accordance with one or more exemplary embodiments.

Referring to FIG. 8, FIG. 8 is a diagram 800 depicting an embodiment of spice or condiments dispensing device, in accordance with one or more exemplary embodiments. The spice or condiments dispensing device 800 includes spice pods (P802), a spice rack motor assembly (P804), a load cell (P806), a condiment transportation tube (P808), a curry vessel (P810), and a spice dispensing motor assembly (P812), a water pod (P814), an oil pod (P816), a lid (P818), and an enclosure (P820). The spice pods (P802) may be configured to store various types of spices and the spice dispensing motor assembly (P812) may be configured to dispense the various types of spices into the curry vessel (P810) through the condiment transportation tube (P808). The load cell (P806) may be configured to accurately weigh spices before dispensing them into the curry vessel (P810). The spice dispensing motor assembly (P812) may be configured to rotate the augur screw inside the condiment transportation tube (P808) which transports the spices to the curry vessel (P810). Based on the commands from the cooking assistance module (P722): the spice rack motor assembly (P804) rotates the spice rack so as to accurately position the required spice pods (P802) in position for dispensing based on the encoder feedback. The spice dispensing motor assembly (P812) dispenses the spice into the condiment tube which is mounted on the load cell (P806), the load cell (P806) provides weight of the spice being dispensed as which is mounted on the load cell (P806), the load cell (P806) provides weight of the spice being dispensed as a real time feedback to the spice dispensing process so as to accurately dispense. The water pod (P814) may be configured to hold water as added by the user based on the requirement of the user. The oil pod (P816) may be configured to store oil to be used for cooking. The lid (P818) is for covering the steamer which may be placed inside the curry vessel (P810). The enclosure (P820) may be the enclosure of the spice or condiments dispensing device.

Figure 9:
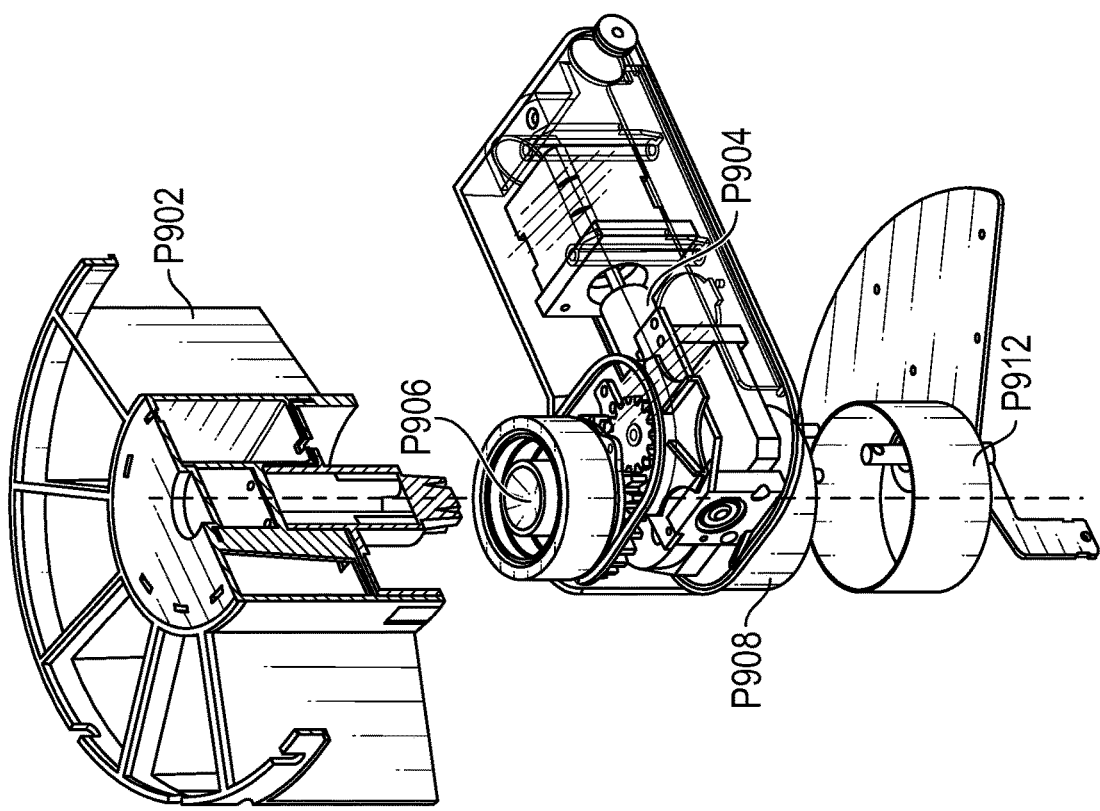
FIG. 9 is a diagram depicting an embodiment of an ingredient dispensing device, in accordance with one or more exemplary embodiments.
Figure 9:
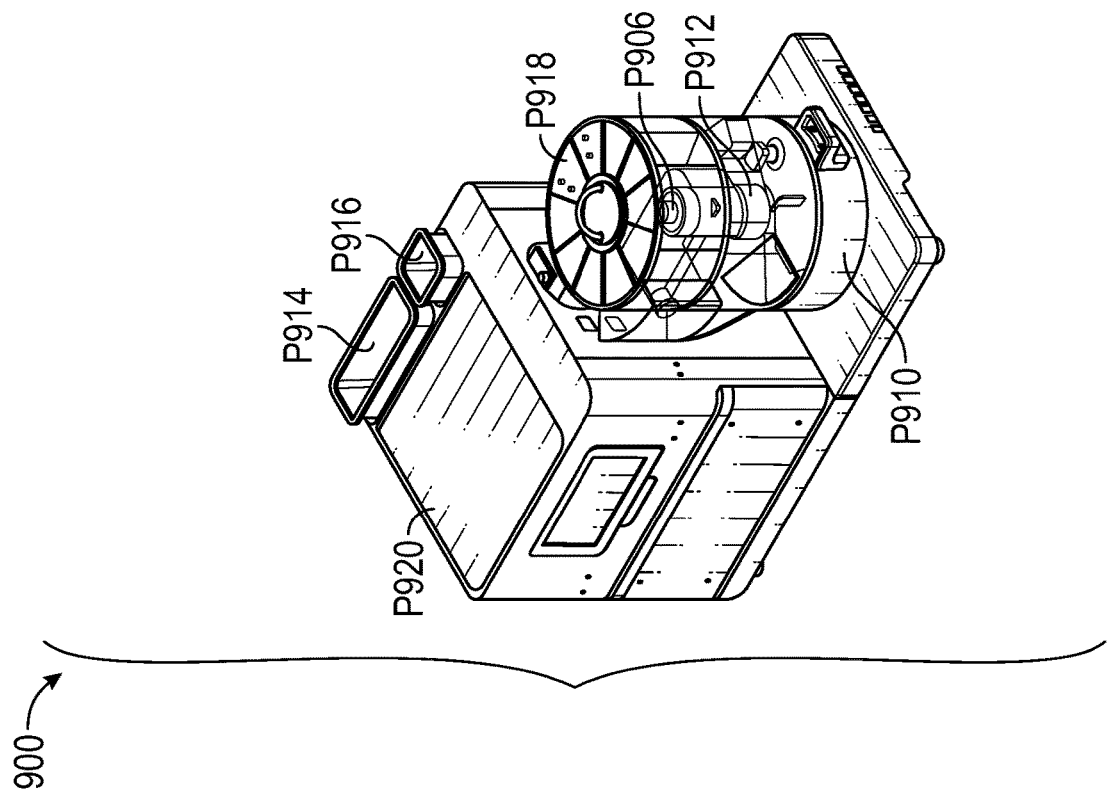

Referring to FIG. 9, FIG. 9 is a diagram 900 depicting an embodiment of an ingredient dispensing device, in accordance with one or more exemplary embodiments. The ingredient dispensing device 900 includes an ingredient rack (P902), a motor assembly (P904), an ingredient rack attachment socket (P906), a stirrer attachment socket (P908), a curry vessel (P910), a stirrer (P912), a water pod (P914), an oil pod (P916), and a lid (P918), and an enclosure (P920). The ingredient rack (P902) may be configured to hold ingredients that go into the curry vessel (P810) and the ingredient rack (P902) rotates based on a recipe to dispense the ingredients into the curry vessel (P810) at a predetermined interval of time. The motor assembly (P904) may be configured to dispense the ingredients into the curry vessel (P810). The stirrer (P912) may be configured to stir the ingredients in the curry vessel P810. The water pod (P914) may be configured to hold water as added by the user based on the requirement of the user. The oil pod (P916) may be configured to store oil to be used for cooking. The lid (P918) is for covering the ingredient rack attachment socket (P906) and the stirrer (P912) which may be placed inside the curry vessel (P910). The enclosure (P920) may be the enclosure of the ingredient dispensing device.

The cooking assistance module (P722) during the cooking cycle issues commands to either rotate the ingredient rack (P902) to dispense the ingredients into the curry vessel (P810) or to stir the stirrer (P912) based on the recipe instruction. The ingredient rack (P902) has a static outer frame as well as the internal moving dynamic part, the ingredient rack static outer frame is locked into the arm using the top socket so that it stays fixed for the entire duration of the cooking cycle which allows the internal dynamic part to rotate. The stirrer (P912) is attached to the arm using the stirrer attachment socket (P908). The one-way bearing present in the motor assembly (P904) restricts the rotation of the dynamic part to only one direction. This allows us to use the same motor assembly (P904) for both dispensing ingredients as well as to perform the stirring action. One direction performs the dispensing action, the other performs the stirring action.

Figure 10:
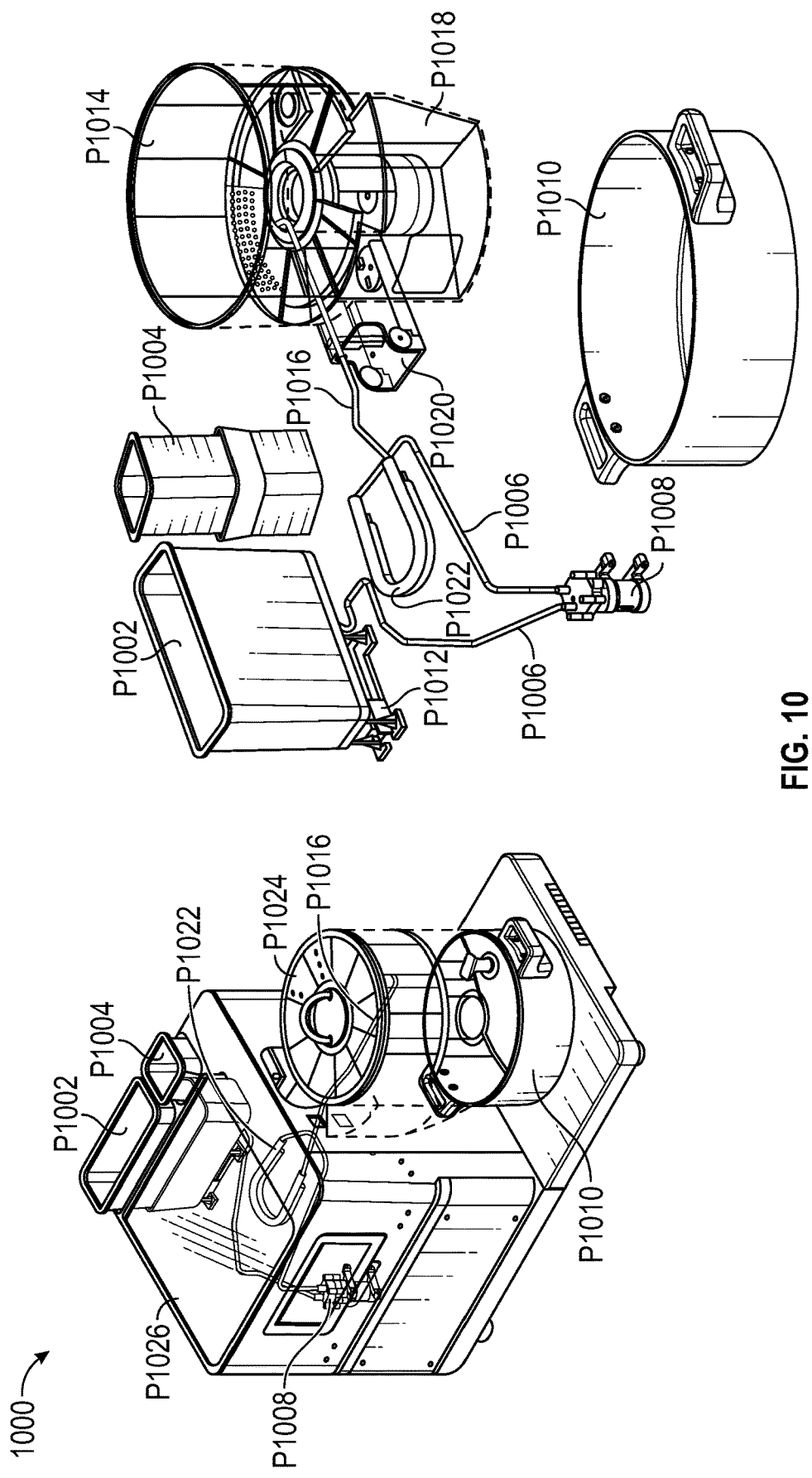
FIG. 10 is a diagram depicting an embodiment of a steamer unit, in accordance with one or more exemplary embodiments.

Referring to FIG. 10, FIG. 10 is a diagram 1000 depicting an embodiment of a steamer unit, in accordance with one or more exemplary embodiments. The steamer unit 1000 includes a water pod (P1002), an oil pod (P1004), pipes (P1006), a motor assembly (P1008), a curry vessel (P1010), load cells (P1012), the ingredient rack (P1014), a steam pipe (P1016), an ingredient rack bottom section (P1018), a mechanical arm (P1020), a thermo block (P1022), a lid (P1024), and an enclosure (P1026). The water pod (P1002) may be configured to hold water as added by the user based on the requirement of the user. The oil pod (P1004) may be configured to store oil to be used for cooking. The motor assembly (P1008) may be configured to dispense the water and oil into the curry vessel (P1010) through the pipes P1006. The load cell (P1012) may be configured to accurately weigh water and oil before dispensing them into the curry vessel (P1010). The ingredient rack (P1014) and the ingredient rack bottom section (P1018) may be configured to hold ingredients that go into the curry vessel (P1010) and the ingredient rack (P1014) rotates based on a recipe to dispense the ingredients into the curry vessel (P1010) at a predetermined interval of time. The steam is generated in the thermo block (P1022). The water is pumped into the thermo block (P1022) which converts it into steam and then goes into the ingredient rack (P1014) to steam the ingredients. The mechanical arm (P1020) acts as a base to the ingredient rack (P1014). A pipe connection (P1006) to the water pod (P1002), the pump (P1008), the thermo block (P1022), and the steam pipe (P1016) to the bottom of the ingredient rack (P1014) which are pre-defined slots for ingredients that have to be steamed in the cooking process. The cooking assistance module (P722) issues commands to the pump (P1008) and the thermo block (P1022) to generate steam. The temperature sensor on the thermo block (P1022) provides the real time feed on the temperature, the load cell (P1012) on the water pod (P1002) provides real time weight information, the cooking assistance module (P722) uses this feedback to control the steam generation. The lid (P1024) is for covering the ingredient rack (P1014) and ingredient rack bottom section (P1018) which may be placed inside the curry vessel (P1010). The enclosure (P1026) may be the enclosure of the steamer unit.

Figure 11:
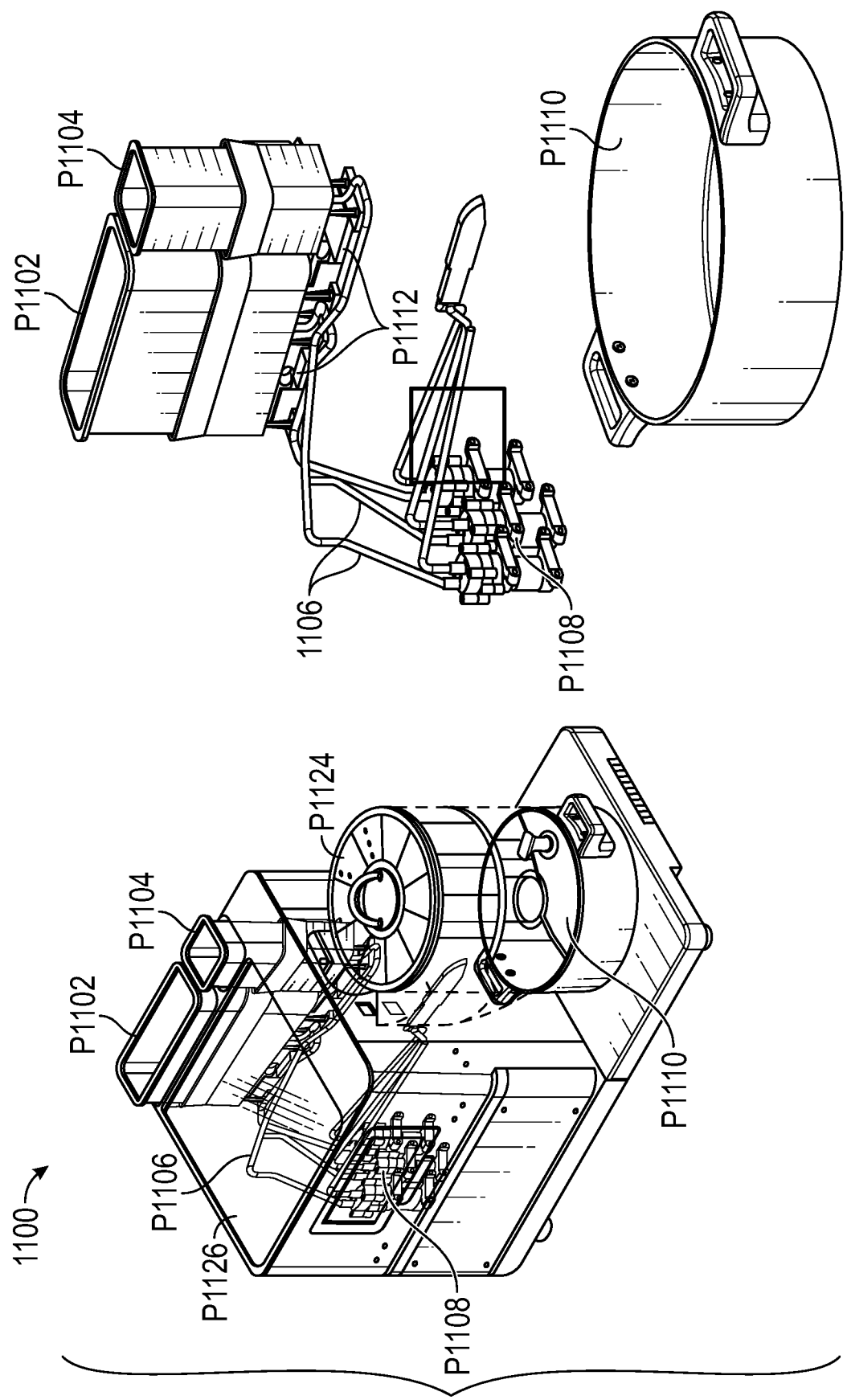
FIG. 11 is a diagram depicting an embodiment of a liquid dispensing device, in accordance with one or more exemplary embodiments.

Referring to FIG. 11, FIG. 11 is a diagram 1100 depicting an embodiment of a liquid dispensing device, in accordance with one or more exemplary embodiments. The liquid dispensing device 1100 includes a water pod (P1102), an oil pod (P1104), pipes (P1106), a motor assembly (P1008), the curry vessel (P1110), and the load cells (P1112). The pipe (P1106) connection to the water pod (P1102), the pump (P1108), the oil pod (P1104), a lid (P1124), and an enclosure (P1126). The cooking assistance module (P722) issues commands to the pump (P1108) to dispense liquid. The load cell (P1112) on the water pod (P1102) and the oil pod (P1104) may provide real time weight information, the cooking assistance module (P722) uses this feedback to control the dispense of liquid. The motor assembly (P1108) may be configured to dispense the water and oil into the curry vessel (P1110) through the pipes P1106. The lid (P1124) is for covering the curry vessel (P1110). The enclosure (P1026) may be the enclosure of the liquid dispensing device.

Figure 12:
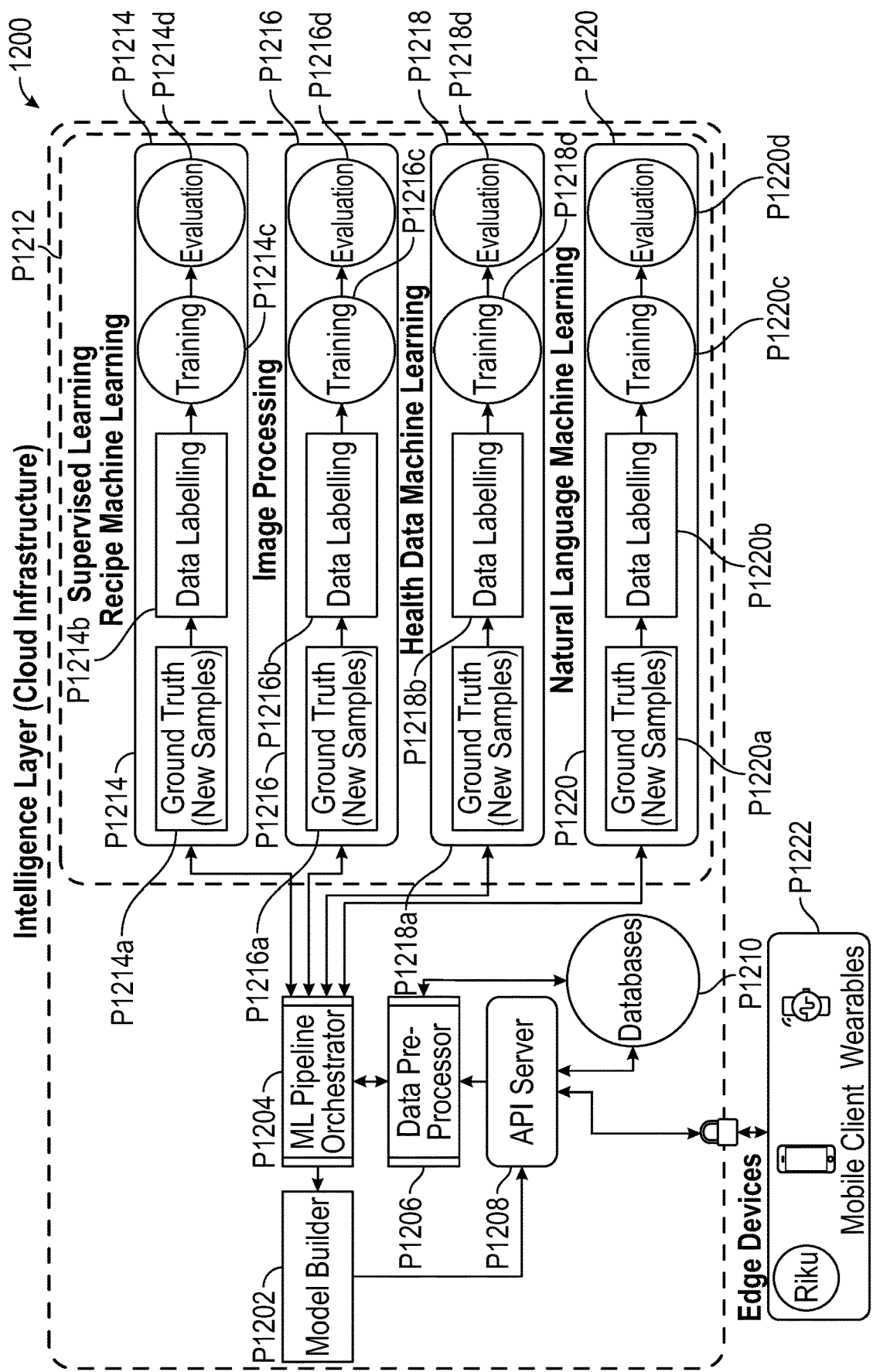
FIG. 12 is a diagram depicting an embodiment of an intelligence layer or cloud infrastructure, in accordance with one or more exemplary embodiments.

Referring to FIG. 12, FIG. 12 is a diagram 1200 depicting an embodiment of an intelligence layer or cloud infrastructure, in accordance with one or more exemplary embodiments. The intelligence layer corresponds to a cloud infrastructure that may process that data collected from various sources. The intelligence layer or cloud infrastructure 1200 includes a model builder (P1202), a machine learning pipeline orchestrator (P1204), a data pre-processor (P1206), an API server (P1208), databases (P1210), and a supervised learning layer (P1212). The supervised learning layer (P1212) includes a recipe machine learning module (P1214), an image processing module (P1216), a health data machine learning module (P1218), a natural language machine learning module (P1220), and edge devices (P1222). The intelligence layer 1200 is a cloud of cloud services.

The machine learning pipeline orchestrator (P1204) is a program which manages different modules to execute machine learning workflow by keeping track of the status of each of the processes. The data pre-processor (P1206) is a module which cleans, normalizes and formats the data that receives from various sources so as to match the requirements of all the pipelines. The data pre-processor (P1206) may include a set of programs to access and update the databases (P1210) or cloud databases. The recipe machine learning module (P1214) includes collection of new samples (P1214a), a data labelling module (P1214b), a training module (P1214c), and an evaluation module (P1214d). The image processing module (P1216) includes a samples module (P1216a), a data labelling (P1216b), a training (P1216c), and an evaluation (P1216d). The health data machine learning module (P1218) includes collection of new samples (P1218a), a data labelling (P1218b), a training (P1218c), and an evaluation (P1218d). The natural language machine learning module (P1220) includes collection of new samples (P1220a), a data labelling (P1220b), a training (P1220c), and an evaluation (P1220d). The edge devices (P1222) may include a voice assistant module and the health monitoring device or third party device configured to guide the user and provide health data via an application programming interface.

The data labelling (P1214b)/(P1216b)/(P1218b)/(P1220b) may be configured to label data for example: a chef can label an image taken during the cooking process as done or not done or give a score on the brownness of the onions during sauteing. The collection of new samples data (P1214a)/(P1216a)/(P1218a)/(P1220a) may be from different sources. A web interface may be on any device that opens a webpage for this step, where skilled users (for example, chef) may label the records. The available data may split into two datasets, one of the datasets for training the recipe machine learning module (P1214), the image processing module (P1216), the health data machine learning module (P1218), the natural language machine learning module (P1220) and another to evaluate them. The training modules (P1214c)/(P1216c)/P1218c)/(P1220c) in the recipe machine learning module (P1214), the image processing module (P1216), the health data machine learning module (P1218), the natural language machine learning module (P1220) use the training data to train and re-train and the evaluation dataset is used to evaluate and get a prediction score.

Once the evaluation (P1214d)/(P1216d)/(P1218d)/P1220d) is done, the machine learning model may be deployed on the edge devices (P1222). Since the edge devices (P1222) have limited computing resources the model builder (P1202) optimized the model for edge device machine learning: optimized for latency, privacy, connectivity, foot print and power consumption. Here, tensorflow models may be converted to tensorflow lite models. The API server (P1208) acts as the gateway for the infrastructure to the outside system: the API server (P1208) manages the routing of various requests and also provides the security check.

Figure 13:
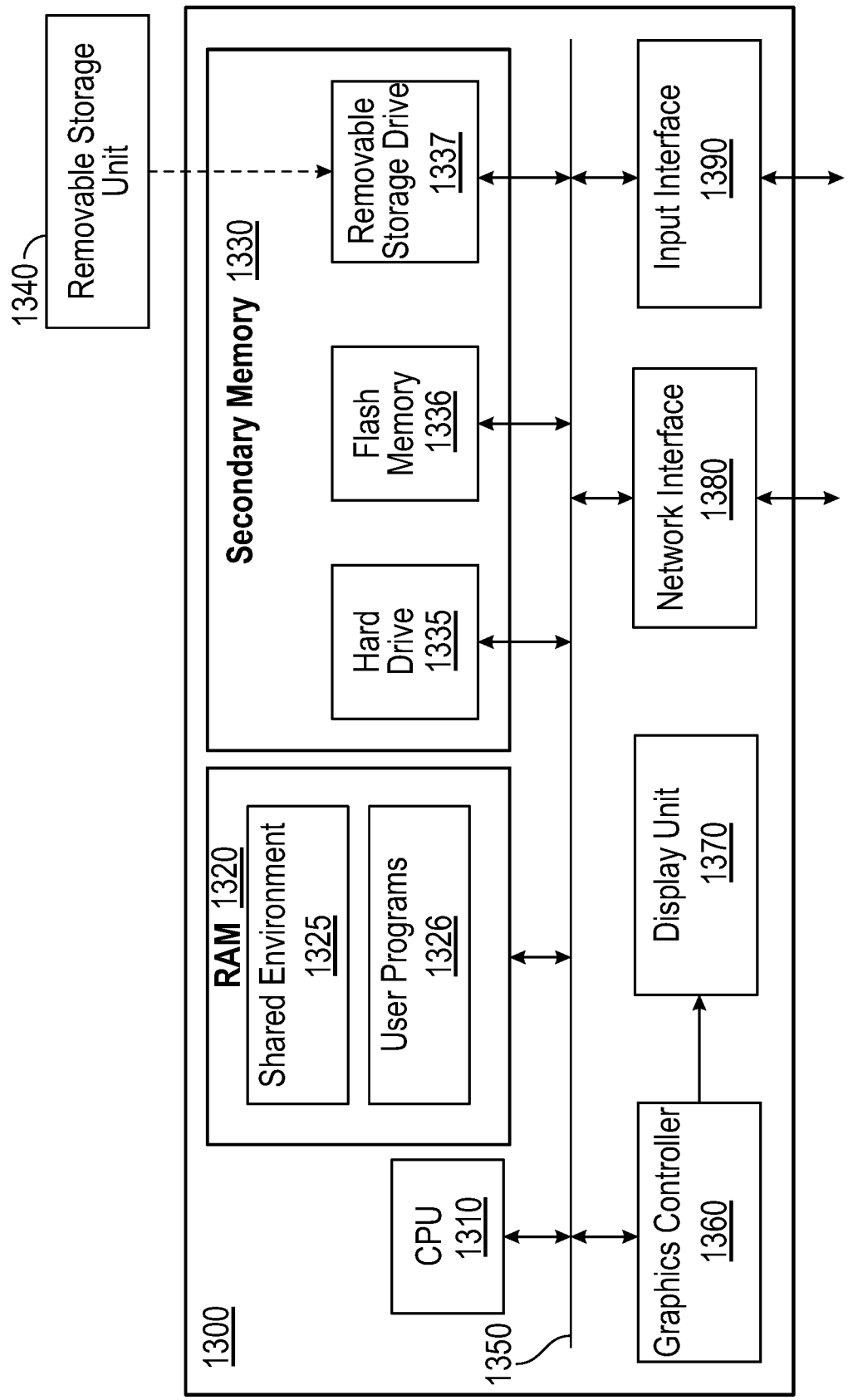
FIG. 13 is a block diagram illustrating the details of processing system, in which various aspects of the present disclosure are operative by execution of appropriate software instructions.

Referring to FIG. 13, FIG. 13 is a block diagram 1300 illustrating the details of processing system in which various aspects of the present disclosure are operative by execution of appropriate software instructions. Digital processing system 1300 may correspond to the architecture 100 (or any other system in which the various features disclosed above can be implemented).

Digital processing system 1300 may contain one or more processors such as a central processing unit (CPU) 1310, random access memory (RAM) 1320, secondary memory 1330, graphics controller 1360, display unit 1370, network interface 1380, and input interface 1390. All the components except display unit 1370 may communicate with each other over communication path 1350, which may contain several buses as is well known in the relevant arts. The components of FIG. 13 are described below in further detail.

CPU 1310 may execute instructions stored in RAM 1320 to provide several features of the present disclosure. CPU 1310 may contain multiple processing units, with each processing unit potentially being designed for a specific task. Alternatively, CPU 1310 may contain only a single general-purpose processing unit.

RAM 1320 may receive instructions from secondary memory 1330 using communication path 1350. RAM 1320 is shown currently containing software instructions, such as those used in threads and stacks, constituting shared environment 1325 and/or user programs 1326. Shared environment 1325 includes operating systems, device drivers, virtual machines, etc., which provide a (common) run time environment for execution of user programs 1326.

Graphics controller 1360 generates display signals (e.g., in RGB format) to display unit 1370 based on data/instructions received from CPU 1310. Display unit 1370 contains a display screen to display the images defined by the display signals. Input interface 1390 may correspond to a keyboard and a pointing device (e.g., touch-pad, mouse) and may be used to provide inputs. Network interface 1380 provides connectivity to a network (e.g., using Internet Protocol), and may be used to communicate with other systems connected to the network.

Secondary memory 1330 may contain hard drive 1335, flash memory 1336, and removable storage drive 1337.

Secondary memory 1330 may store the data software instructions (e.g., for performing the actions noted above with respect to the Figures), which enable digital processing system 1300 to provide several features in accordance with the present disclosure.

Some or all of the data and instructions may be provided on removable storage unit 1340, and the data and instructions may be read and provided by removable storage drive 1337 to CPU 1310. Floppy drive, magnetic tape drive, CD-ROM drive, DVD Drive, Flash memory, removable memory chip (PCMCIA Card, EEPROM) are examples of such removable storage drive 1337.

Removable storage unit 1340 may be implemented using medium and storage format compatible with removable storage drive 1337 such that removable storage drive 1337 can read the data and instructions. Thus, removable storage unit 1340 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1340 or hard disk installed in hard drive 1335. These computer program products are means for providing software to digital processing system 1300. CPU 1310 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1330. Volatile media includes dynamic memory, such as RAM 1320. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

What is claimed is:

1. An artificial intelligence driven cooking system, comprising:

an intelligence layer is connected to a plurality of databases, whereby said plurality of databases configured to store various information and said intelligence layer configured to collect and analyze technical data obtained from a plurality of modules, said intelligence layer corresponds to a cloud infrastructure that processes data from said plurality of modules, said plurality of databases comprises a recipe database, a cooking parameters database, and a diagnostics database;

a device layer comprises an automated cooking device and a cooking assistance module, whereby said cooking assistance module and said automated cooking device are configured to retrieve information from said plurality of databases and a feedback received from said cooking assistance module is used to update a cooking process, said recipe database, said cooking parameters database, said diagnostics database configured to provide necessary information for said cooking assistance module with recipe instructions needed for a selected recipe, said cooking assistance module corresponds to an on-device software module which makes automatic cooking happen;

a computing device or an edge device comprises a voice assistant and a wearable health monitoring device are connected to said automated cooking device through said cooking assistance module, said voice assistant module and said wearable health monitoring device or a third party device configured to guide a user and provide health data via an application programming interface, a user's interaction with said automated cooking device through a touch screen, and a voice recognition feature through said voice assistant and said wearable health monitoring device or said third party device configured to provide the health data to said plurality of modules, whereby said automated cooking device comprises a curry vessel and an ingredient rack, said ingredient rack configured to hold ingredients that go into said curry vessel and said ingredient rack rotates based on a recipe to dispense said ingredients into said curry vessel at a predetermined interval of time; a rice vessel positioned on a first induction cooktop and said curry vessel positioned on a second induction cooktop, whereby said first induction cooktop configured for cooking rice and said second induction cooktop configured for curry making.

2. The artificial intelligence driven cooking system of claim 1, wherein said automated cooking device comprises stirrers positioned in said curry vessel.

3. The artificial intelligence driven cooking system of claim 1, wherein said automated cooking device comprises a pair of removable pods configured to hold liquids and a motor assembly dispenses said liquids into said curry vessel.

4. The artificial intelligence driven cooking system of claim 1, wherein said automated cooking device comprises a condiment transportation tube configured to transfer condiments from a condiments rack to said rice vessel and said curry vessel.

5. The artificial intelligence driven cooking system of claim 1, wherein said automated cooking device comprises a mechanical arm which acts as a base to said ingredient rack and also rotates said stirrer.

6. The artificial intelligence driven cooking system of claim 1, wherein said automated cooking device comprises a weighing scale configured to weigh said ingredients before placed in said ingredient rack.

7. The artificial intelligence driven cooking system of claim 1, wherein said automated cooking device comprises a touchscreen display configured to display various modes for said user to operate as per the requirement.

8. The artificial intelligence driven cooking system of claim 5, wherein said automated cooking device comprises an infrared thermal camera and a high definition camera are located in said mechanical arm.

9. The artificial intelligence driven cooking system of claim 1, wherein said automated cooking device comprises a steamer in a bottom section of said ingredient rack and said steamer steams vegetables that go into the curry inside said curry vessel on said second induction cooktop.

* * * * *